(12) United States Patent
Stravitz

(10) Patent No.: US 8,939,310 B1
(45) Date of Patent: Jan. 27, 2015

(54) MULTI-COMPARTMENT VESSEL

(71) Applicant: David M Stravitz, New York, NY (US)

(72) Inventor: David M Stravitz, New York, NY (US)

( * ) Notice: Subject to any disclaimer, the term of this patent is extended or adjusted under 35 U.S.C. 154(b) by 0 days.

(21) Appl. No.: 14/220,481

(22) Filed: Mar. 20, 2014

Related U.S. Application Data

(63) Continuation-in-part of application No. 13/972,118, filed on Aug. 21, 2013, now Pat. No. 8,684,218.

(51) Int. Cl.
| | |
|---|---|
| *B65D 6/02* | (2006.01) |
| *B65D 8/04* | (2006.01) |
| *B65D 1/24* | (2006.01) |
| *B65D 25/04* | (2006.01) |
| *B65D 3/24* | (2006.01) |

(52) U.S. Cl.
CPC .................................. *B65D 3/24* (2013.01)
USPC ........ 220/504; 220/4.03; 220/4.21; 220/4.27; 220/789; 220/801

(58) Field of Classification Search
USPC ............. 220/504, 4.03, 4.21, 4.26, 4.27, 789, 220/801
See application file for complete search history.

(56) References Cited

U.S. PATENT DOCUMENTS

| | | | |
|---|---|---|---|
| 2,611,499 A * | 9/1952 | Mayer ................................. 215/6 |
| 2,910,264 A | 10/1956 | Lindenberger | |
| 4,234,097 A * | 11/1980 | Daenen ......................... 220/4.27 |
| 4,505,446 A | 3/1985 | Roder | |
| 5,000,123 A | 3/1991 | Morse et al. | |
| D357,170 S | 4/1995 | Wellsfry | |
| 5,499,738 A | 3/1996 | Burleigh | |
| 5,630,523 A | 5/1997 | Wright | |
| 5,743,210 A | 4/1998 | Lampe | |
| 5,884,796 A * | 3/1999 | Hallmark ................... 220/23.88 |
| 6,105,812 A | 8/2000 | Riordan | |
| 6,138,687 A | 10/2000 | Sheffler et al. | |
| 6,145,685 A | 11/2000 | Dick | |
| 6,196,412 B1 | 3/2001 | Cattell | |
| 6,581,541 B2 | 6/2003 | Hollinger | |
| 7,124,883 B1 | 10/2006 | Thomas et al. | |
| D595,565 S | 7/2009 | Robertson et al. | |
| 8,186,642 B2 | 5/2012 | Weiss-Vons | |
| 8,231,089 B2 | 7/2012 | Mills | |
| 8,353,421 B2 | 1/2013 | Rosazza et al. | |
| 8,640,905 B2 | 2/2014 | Gibson et al. | |
| 2004/0217023 A1 | 11/2004 | Fagg et al. | |

(Continued)

FOREIGN PATENT DOCUMENTS

CA          627901 A          9/1961

*Primary Examiner* — Fenn Mathew
*Assistant Examiner* — Jennifer Castriotta
(74) *Attorney, Agent, or Firm* — Brian Roffe

(57) ABSTRACT

Vessel including a unitary or two-part vessel base having an intermediate wall portion, upper and lower wall portions on opposite sides of the intermediate wall portion, and upper and lower rims adjacent the respective upper and lower wall portions. The upper and intermediate wall portions define an upper chamber space including at least one upper chamber. The lower and intermediate wall portions define a lower chamber space including at least one lower chamber. Inner lids engage with upper and lower lid-receiving portions, respectively, defined by the vessel base to selectively close the upper or lower chamber space. The two-part vessel base has a mating structure to facilitate selective attachment and separation. Outer lids engaged the upper and lower rims independent of the engagement of the inner lids with the vessel base.

22 Claims, 21 Drawing Sheets

(56) References Cited

U.S. PATENT DOCUMENTS

| | | |
|---|---|---|
| 2006/0151511 A1 | 7/2006 | Kaposi |
| 2009/0084795 A1 | 4/2009 | Kagen |
| 2009/0223999 A1 | 9/2009 | Hill et al. |
| 2010/0078341 A1 | 4/2010 | Rasmussen et al. |
| 2010/0078436 A1 | 4/2010 | Winchell et al. |
| 2013/0134161 A1 | 5/2013 | Fogel |

* cited by examiner

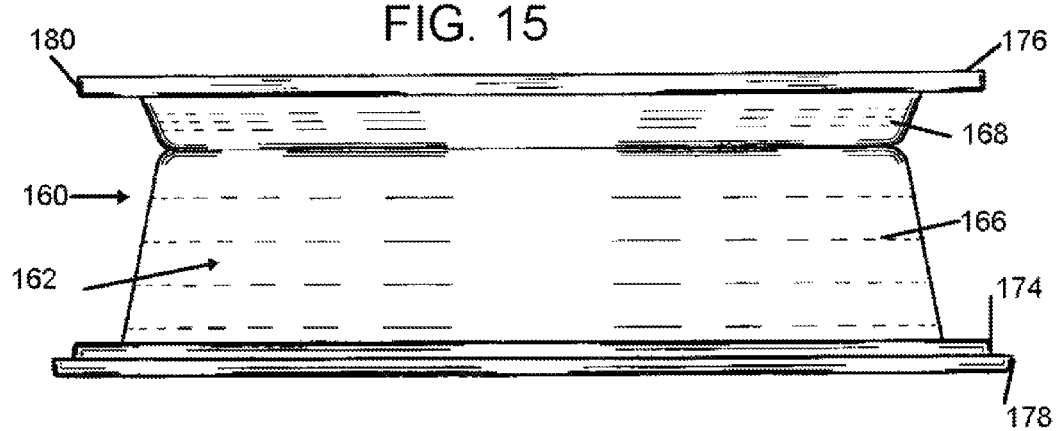
FIG. 15
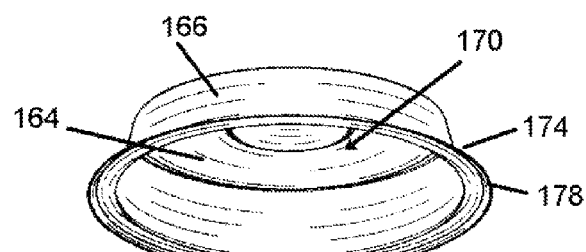
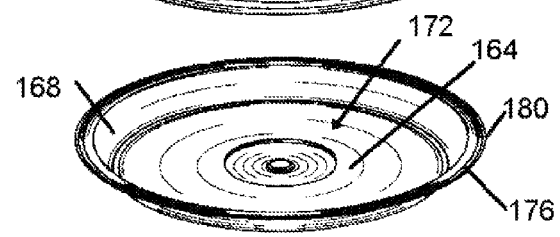
FIG. 17
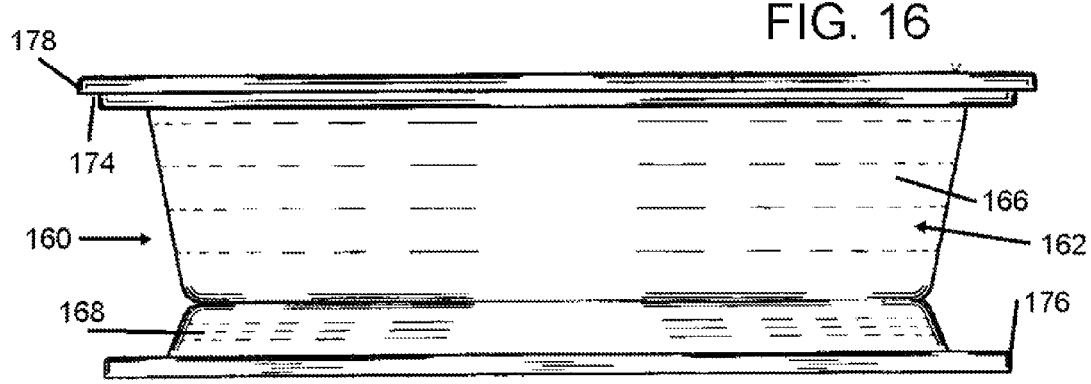
FIG. 16

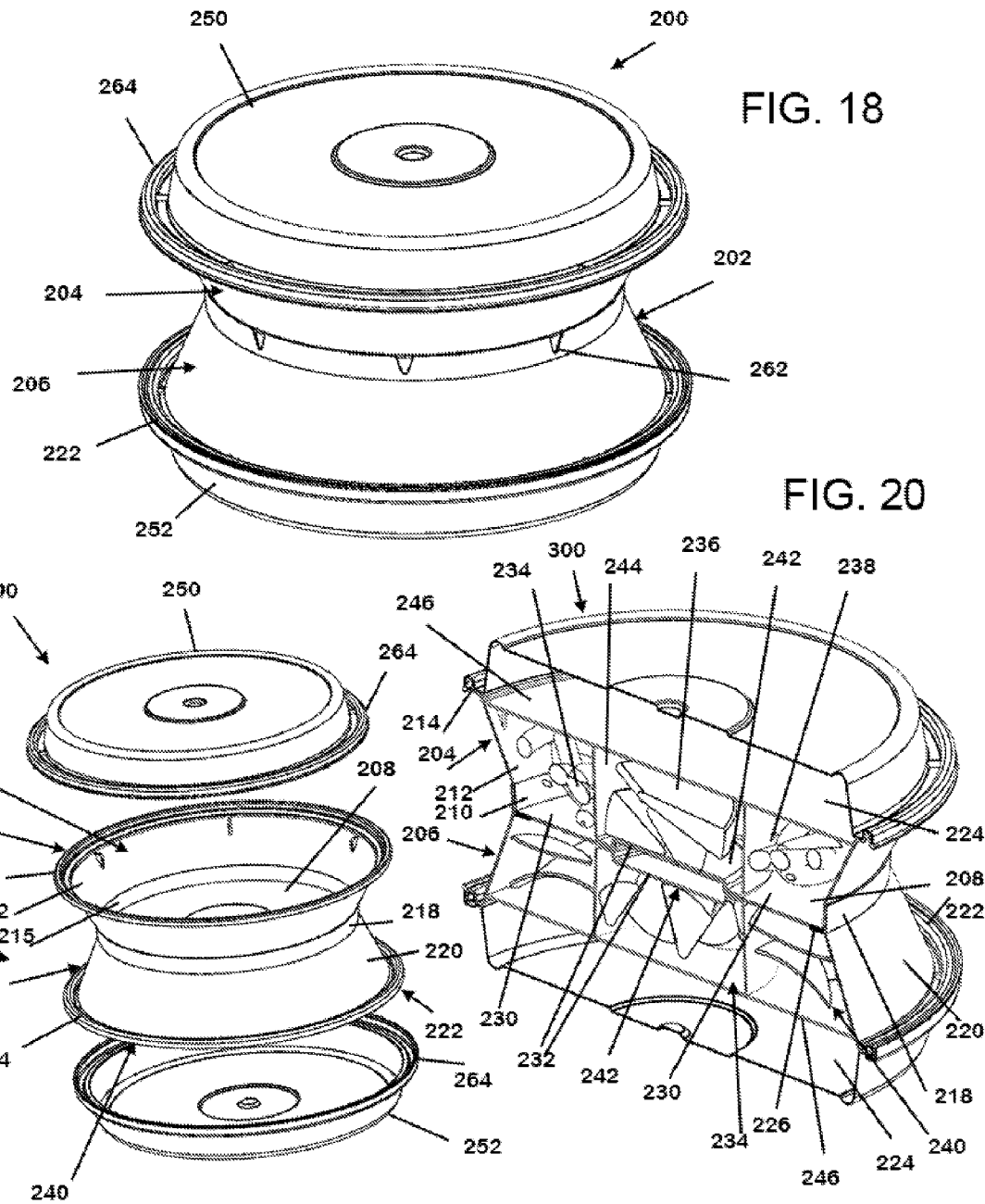

MULTI-COMPARTMENT VESSEL

CROSS-REFERENCE TO RELATED APPLICATION

This application is a continuation-in-part of U.S. patent application Ser. No. 13/972,118 filed Aug. 21, 2013, which is incorporated by reference herein.

FIELD OF THE INVENTION

The present invention relates generally to vessels for use in storage, packaging and serving and more particularly, to a vessel that has multiple compartments for storing potentially different objects and is also capable of being attached and/or used in two different orientations by suction.

The present invention is also directed generally to methods for storing objects, including but not limited to food, using a multi-compartment vessel or container so that potentially different items can be stored in the same vessel.

BACKGROUND OF THE INVENTION

Storage vessels or containers are well-known and used in everyday living. Some, such as those used for feeding infants and toddlers, are in addition to being provided with a closure mechanism such as a lid, also provided with a suction capability to enable them to be attached to trays and tables in an effort to reduce spillage of the contents therefrom.

For example, U.S. Pat. No. 5,000,123 (Morse et al.) describes an anti-tipping feed dish formed with a truncated conical exterior wall coaxially defining a feed bowl cavity arranged interiorly of the dish, and that defines a feed bowl floor. A bowl floor is spaced from the feed bowl floor and defines a lower cavity coaxially arranged with the feed bowl cavity which in turn defines an enclosed cavity capturing a predetermined quantity of weighted materials. The bowl floor may have mounted thereto, suction cups to enhance securement of the bowl to a support surface.

U.S. Pat. No. 8,231,089 (Mills) describes a plate holder comprising a skirt having a top member and one or more side walls forming a cavity therebetween when the one or more side walls are resting on a substrate with the top member oriented away from the substrate, and a base coupled with the skirt and located within the cavity. The base has one or more top suction device receptacles and one or more bottom suction device receptacles. A respective top suction device is coupled with each top suction device receptacle such that the top suction device is oriented away from the substrate. Similarly, a respective bottom suction device is coupled with each bottom suction device receptacle such that the bottom suction device is oriented toward the substrate.

OBJECTS AND SUMMARY OF THE INVENTION

It is an object of an embodiment of the present invention to provide vessels for use in storage, packaging and serving.

It is another object of an embodiment of the present invention to provide a vessel that has multiple compartments for storing different objects and might also capable of being attached in two different orientations by suction.

It is yet another object of an embodiment of the present invention to provide a method for storing objects, including but not limited to food, using a multi-compartment container so that potentially different items can be stored in the same vessel.

A vessel in accordance with the invention includes a vessel base comprising an intermediate wall portion, an upper and a lower side wall portion on opposite sides of the intermediate wall portion, and an upper and lower rim adjacent the lower and upper side wall portions, respectively. The side wall portions and intermediate wall portion define upper and lower chamber spaces each including at least one chamber. The upper and lower rims are optionally configured to provide suction when pressed against a flat surface.

Lids engage with upper and lower lid-receiving portions defined by the vessel base to selectively close the chamber spaces. More specifically, the vessel includes one or two upper lids that selectively close the upper chamber space. When present, an upper inner lid engages with an upper lid receiving portion defined by the vessel base inward of the upper rim, and when present, an upper outer lid engages with the upper rim and surrounds the upper inner lid when present. Both upper lids may be used at the same time to define an additional compartment therebetween or separately. The vessel also includes one or two lower lids that selectively close the lower chamber space. When present, a lower inner lid engages with a lower lid receiving portion defined by the vessel base inward of the lower rim and when present, a lower outer lid engages with the lower rim and surround the lower inner lid when present. Both lower lids may be used at the same time to define an additional compartment therebetween or separately.

To aid in closure, a lid-engaging structure for removably trapping the inner lids onto the base is provided, e.g., circumferential beads, and a lid-supporting structure for supporting the inner lids in engagement with the base, e.g., one or more ribs, is also provided.

In one embodiment, the base has a unitary structure. In another, it is formed from two parts.

In either case, a container support structure may be provided to support at least one interior container in each chamber space. The container support structure may include a rim formed on the intermediate wall and extending into each chamber space. In this case, interior containers are provided, each including a lower rim configured to abut against an inner surface of a rim formed on the intermediate wall. Each container may include an annular wall and the inner lids each may include a rim on an underside that engages with the interior container to thereby secure the interior containers in connection with the base.

As to the stackability feature, the upper rim is configured to have a complementary structure to the lower rim to enable stackability of the vessel via engagement of a lower rim of one vessel to an upper rim of another vessel. This may be achieved by providing a U-shaped channel on one rim and the other rim with a complementary U-shaped cross-section.

Another embodiment of a vessel includes two inner lids and a vessel base including compartment forming structure for forming two independent, unconnected compartments opening on upper and lower sides of the base, an optional suction-providing structure arranged at upper and lower edges of the compartment forming structure to enable the base to be suction-attached to a surface, a cooperating mating structure arranged at the upper and lower edges of the compartment forming structure to enable the vessel to be stacked onto another vessel, and a lid-engaging structure for releasably securing the inner lids in connection with the base. Also, an interior compartment defining structure may be arranged on the compartment forming structure and/or the inner lids for partitioning a compartment into a plurality of independent sub-compartments.

The inner lid with the annular ring seals in the interior compartment and prevents the migration of the contents, liquid or solid, from migrating over to the other compartments in the vessel. It thus functions like a lid within a lid. This is advantageous when stacking, turning over or traveling, etc.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 15 is a side view of another embodiment of a vessel in accordance with the invention in one orientation;

FIG. 16 is a side view of the embodiment shown in FIG. 15 in an inverted configuration;

FIG. 17 shows the attachment of the upper and lower portions of the vessel shown in FIGS. 15 and 16;

FIG. 18 is a perspective view of another embodiment of a vessel in accordance with the invention;

FIG. 19 is an exploded view of a vessel similar to the one shown in FIG. 18;

FIG. 20 is a cross-sectional view of a vessel similar to the one shown in FIG. 19;

DETAILED DESCRIPTION OF THE INVENTION

Figure 1:
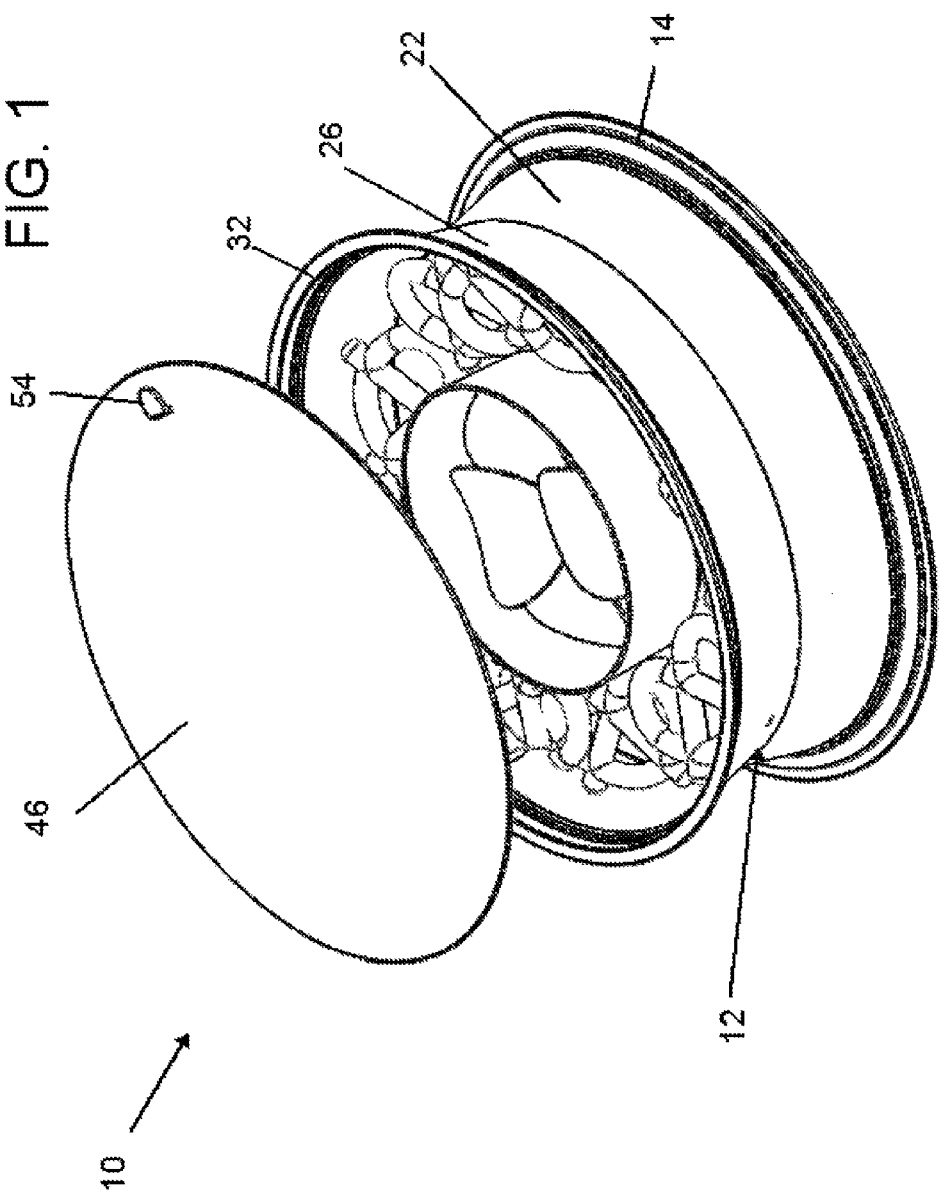
FIG. 1 is a perspective view of a first embodiment of a vessel in accordance with the invention shown with its lid in an open state and items stored therein being visible.

Referring to the accompanying drawings wherein like reference numerals refer to the same or similar elements, a first embodiment of a multi-compartment vessel in accordance with the invention is designated generally as 10 and is shown in FIGS. 1-7. Vessel 10, which may also be referred to as a utensil, container, housing, package or bowl, includes a vessel base 12 that defines at least one chamber on each side, i.e., when the vessel 10 is placed onto a horizontal surface, there is at least one chamber that opens upward in a direction away from the horizontal surface and at least one other chamber that opens in a direction downward toward the horizontal surface. The upwardly opening chamber may, when accessible, be used to serve food if stored in this chamber or access objects such as hardware when stored in this chamber. The downwardly opening chamber would be sealed by a sealing mechanism and prevent any food or objects therein from spilling out onto the horizontal surface. By inverting the vessel, the downwardly opening chamber would be accessible by removing the sealing mechanism and the upwardly opening chamber would be sealed by engaging its sealing mechanism before inversion. Thus, both chambers may alternatively be used with one being open for accessing the contents thereof while the other is sealed. Both chambers are suctionable with and without sealed content in one or both chambers.

Figure 2:
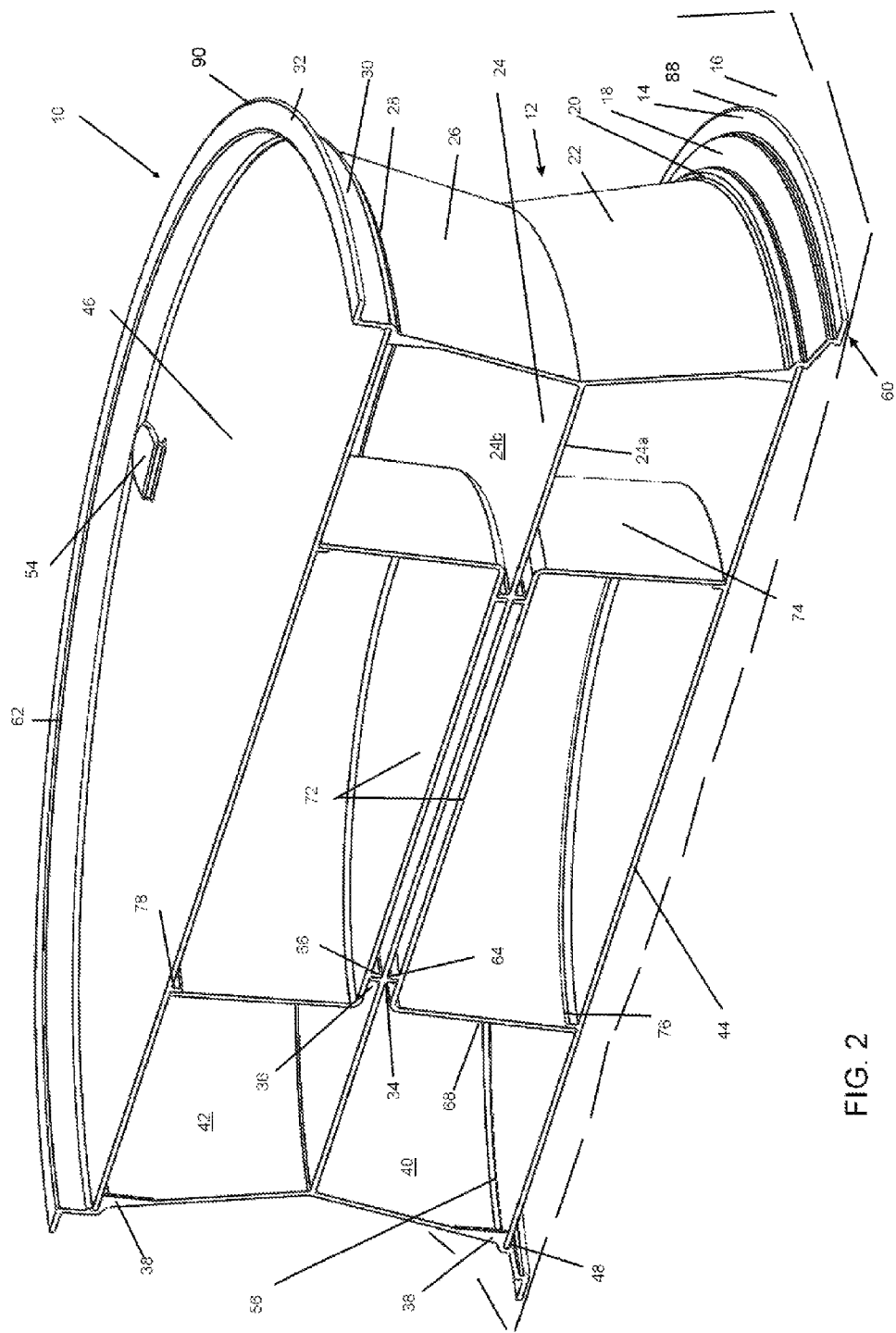
FIG. 2 is a cross-sectional view of the vessel shown in FIG. 1 with the lid engaged during a storage or transport state and without items stored therein.
Figure 3:
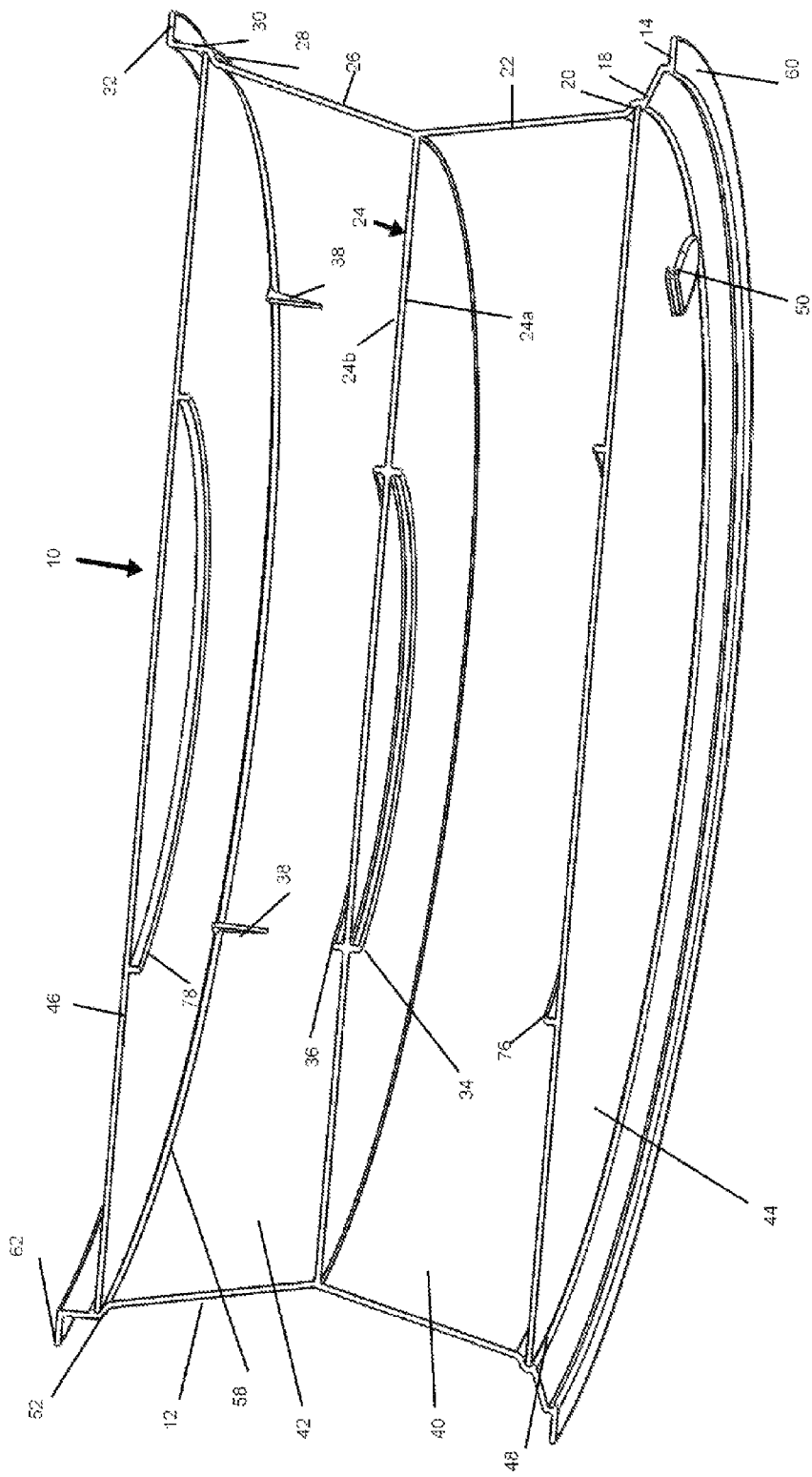
FIG. 3 is a cross-sectional view of the vessel shown in FIG. 1 with the lid engaged during a storage or transport state and without items stored therein, and with interior removable vessels removed.

In the embodiment shown in FIGS. 1-4, vessel base 12 is a unitary structure, so that this embodiment of the vessel 10 is referred to as the unibody. Vessel base 12 has a single body which is shaped in cross-section as shown in FIGS. 2 and 3, i.e., with a lower rim 14 at the bottom (when positioned as shown in FIG. 1 on a horizontal surface 16 represented by the dotted lines in FIG. 2), an upward portion 18 above the lower rim 14 as shown in FIGS. 2 and 3, a side wall defined by an inwardly tapering support portion 20 above the upward portion 18, and another inwardly tapering portion 22 that extends to a substantially circular intermediate wall 24. On the other side of the intermediate wall 24, the base 12 includes substantially the same structure, i.e., a side wall defined by an outwardly tapering portion 26 that extends upward from the intermediate wall 24, an outwardly tapering support portion 28 above the tapering portion 26, an upward portion 30 above the tapering support portion 28 and an upper rim 32.

As shown most clearly in FIG. 3, annular rims 34, 36 are formed on the opposite sides of the intermediate wall 24 and project into the respective chambers on both sides of the intermediate wall 24. Annular rims 34, 36 can be any shape as desired, and can be eliminated should the need for interior containers that are designed to engage with the annular rims 34, 36, not be needed.

An important difference between the structure on opposite sides of the intermediate wall 24 is the form of the upper rim 32 that differs from the form of the lower rim 14 to enable mating of this structure (discussed below with reference to FIGS. 6 and 7). Generally then, the base 12 includes a cooperating mating structure on opposite rims, with one form of the mating structure being integrated in, incorporated into or arranged on the lower rim 14 and the other form of the mating structure being integrated in, incorporated into or arranged on the upper rim 32. This structure may be referred to as cooperating mating means herein.

The combination of the intermediate wall 24 and the inwardly tapering portion 22 define a lower chamber space 40, i.e., defined primarily by a lower surface 24a of the intermediate wall 24 and an inner surface of the inwardly tapering portion 22, while the combination of the intermediate wall 24 and the outwardly tapering portion 26 define an upper chamber space 42, i.e., defined primarily by an upper surface 24b of the intermediate wall 24 and an inner surface of the outwardly tapering portion 26 (see FIG. 3). Thus, the intermediate wall 24 defines both lower and upper chamber spaces 40, 42, i.e., the upper surface 24b of the intermediate wall 24 is the bottom of the upper chamber space 42 in the orientation of the vessel 10 as shown in FIGS. 2 and 3 and the lower surface 24a of the intermediate wall 24 is the bottom of the lower chamber space 40 when the vessel is inverted from the position shown in FIGS. 2 and 3. Generally then, the base includes compartment forming structure or means that defines two independent, unconnected compartments on opposite sides of a common wall or wall structure.

The outer surfaces of the inwardly and outwardly tapering portions 22, 26 may be dimensioned as desired to provide various configurations of the vessel 10 and in particular, either the same or different sizes of the lower and upper chamber spaces 40, 42.

Figure 4:
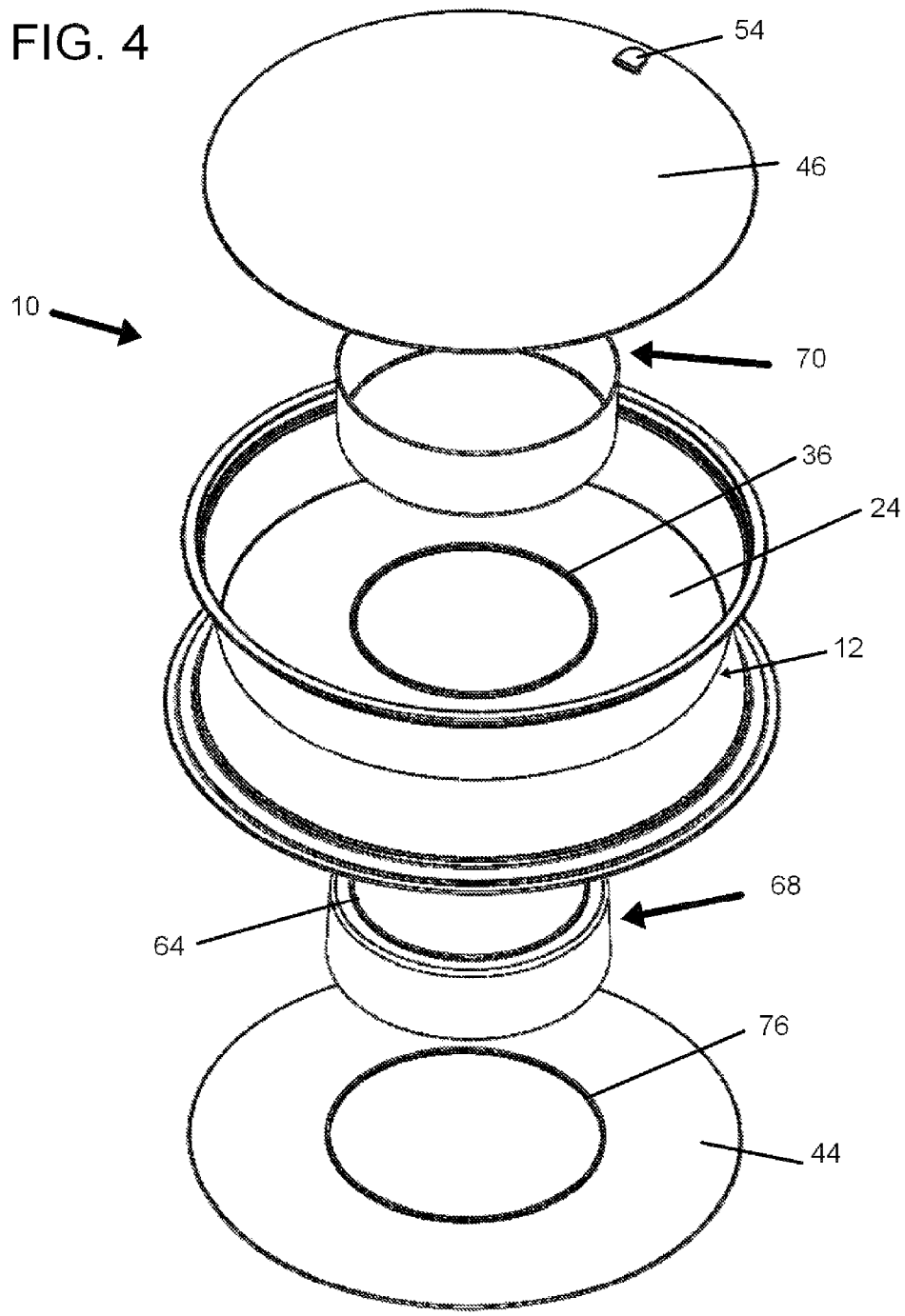
FIG. 4 is an exploded view of the vessel shown in FIG. 1 without items stored therein.

Regarding its shape, vessel 10 may have any desired shape and is not limited by the circular shape shown (see, e.g., FIG. 4). Thus, the vessel base 12 may be constructed with a circumference that is round, square, rectangular, oval circumference, etc., although a preferred shape is circular or round because a suction providing effect of the rims 14, 32 discussed below is best for such a shape.

The illustrated embodiment in FIG. 3 shows the lower and upper chamber spaces 40, 42 having substantially the same size. However, an alternative formation of the body 12 is possible in which a small lower chamber space and a larger upper chamber space are provided (and vice versa). This may be achieved by adjusting the height of the side walls defined by the tapering portions 22, 26. In general, the depiction of the base 12 in the illustrations is not intended to limit the invention and other relative dimensions of the upper and lower chamber spaces 40, 42 are considered part of the invention.

Further, the inwardly and outwardly tapering portions 22, 26 may be substituted for by annular wall portions that have a substantially uniform cross-section, i.e., cylindrical wall portions, or other shapes of tubular wall portions. In its most basic form, the base 12 has a first side wall defining the lower chamber space 40 and a second side wall defining the upper chamber space 42. Also, tapering portions 22, 26 may be constructed without a taper. Thus, the side walls of the chamber spaces 40, 42 may be for example, cylindrical or have the shape of a truncated cone. Although taper may be the preferred embodiment insofar as it assists the spread and prevents inner collapse when performing suction. Another consideration is moldability from injection molding. Taper is critical for releasing the part out of the cavity and core. So even if the shape is substantially cylindrical, a certain amount (½ or 1 degree per side) is necessary. Therefore any taper assists in reducing collapse and thus allow for suction to perform.

To complete the vessel 10, lids 44, 46 removably engage with the base 12 (see FIG. 4). Referring to FIGS. 2 and 3, in particular, lid 44 engages with the support portion 20. To this end, a bead 48 is formed on the support portion 20, on the upward portion 18 adjacent to the support portion 20 and/or at a juncture between the upward portion 18 and the support portion 20. Bead 48 enables the lid 44 to snap onto the base 12, yet also enables its removal from engagement with the base 12 by pulling on a tab 50 formed on the lid 44. Similarly, a bead 52 is formed on the support portion 28, on the upward portion 30 adjacent to the support portion 28 and/or at a juncture between the support portion 28 and the upward portion 30. Bead 52 enables the lid 46 to snap onto the base 12, yet enables its removal from engagement with the base 12 by pulling on a tab 54 formed on the lid 46. Beads 48, 52 may each be a 360° bead that extends entirely around the periphery of the base 12 to trap and seal the respective lid 44, 46 in connection with the base 12. However, beads 48, 52 are not required to extend completely around the periphery of the base 12 if a lower extent of coverage suffices to trap the lids 44, 46 against ribs 38 (discussed below).

Referring to FIGS. 2-5, in a more general manner, the base 12 includes two lid-engaging portions or lid-engaging means that cooperate with lids 44, 46 to enable each lid to be individually engaged with the base 12 to seal a respective one of the chamber spaces 40, 42, while also allowing the lids 44, 46 to be removed from engagement with the base 12 to enable access to the chamber spaces 40, 42. Other structure known to those skilled in the art that performs these functions is also envisioned and within the scope of the invention.

To aid in support of the lids 44, 46, the base 12 includes a lid supporting structure or means formed on the inner surface of the tapering portions 22, 26. In one embodiment, the lid supporting structure comprises a plurality of individual support ribs 38 spaced around the circumference of the inner surface of each of the inwardly tapering portions 22, 26 (see FIG. 3). Each rib 38 projects inward toward a center of the base 12. The inward projecting extension of each rib 38 should be limited to avoid excessively reducing the available storage space. In one embodiment however, the chamber space 40, 42 may be partitioned into several wedge-shaped chambers, with the ribs serving as partitions and thus have a dual function of both partitioning the chamber space into chambers and supporting the lid.

Ribs 38 ideally are molded with the base 12, and thus integrated with the base 12 at the time of manufacture of the vessel 10. Ideally, ribs 38 are formed at a distance from the bead 48, 52 that is substantially the same as the thickness of the lids 44, 46 used with the base 12. The particular configuration and placement of the ribs 38 depends, for example, on the size, shape, volume and diameter of the chamber spaces 40, 42. Also, if desired, ribs 38 may extend alongside the entire side wall portions 22, 26 to the intermediate wall 24.

In another embodiment, instead or in addition to ribs 38, a shelf or ridge 56, 58 that extends around the periphery of the base 12 is provided on the support portions 20, 28, respectively. Each shelf 56, 58, as well the ribs 38, prevents the supported lid 44, 46 from being pressed inward and collapsing inward and onto the contents of the chamber space 40, 42 when present (see FIGS. 2 and 3).

Tabs 50, 54 facilitate lifting of the lids 44, 46, respectively, out of engagement with the base 12, Instead of tabs 50, 54, any type of a lifting structure or lifting means, such as a pull tab may be provided. Tabs 50, 54 may each be a small tab extending outwardly from an area proximate yet spaced apart from an outer edge of the respective lid 44, 46. By pulling each tab 50, 54 upward, the respective lid 44, 46 can be easily removed from engagement with the lid-receiving portion of the base 12. Alternatives to the tabs 50, 54 are known to those skilled in the art and encompassed within lid removal facilitation means in accordance with the invention. For example it is possible in one embodiment, to form each tab 50, 54 as a lift up tab which is part of the lid and has a weakened living hinge so that a person can essentially peel the lid open by grasping and pulling the tab (see FIGS. 2, 4 and 5).

An important feature of the vessel is to enable suction to be provided on both sides. To this end, the lower rim 14 is provided with a flat lower edge 60 around its perimeter that is configured to provide effective suction when the vessel 10 is pressed, in the orientation shown in FIG. 1, downward against a horizontal surface with which suction can develop. Similarly, the upper rim 32 is provided with a flat upper edge 62 around its perimeter that is configured to provide effective suction when the vessel 10 is pressed, in an opposite orientation to that shown in FIG. 1, downward against a horizontal surface with which suction can develop.

As an example, the lower and upper edges 60, 62 may be constructed as a 360° piano flat that forms a seal for suction when pressed against a flat surface against which a suction force can be formed (see FIGS. 2 and 3). This type of seal is particularly effective when a liquid, e.g., water is applied to the lower and upper edges 60, 62.

In a general sense, the rims 14, 32 are provided with suction-providing means that may take the form of a particular construction of the edges of the rims 14, 32.

To avoid interfering with the suction capability of the lower and upper rims 14, 32, it is important to recess the lids 44, 46 away from the suction-providing means of the respective lower and upper rims 14, 32. That is, as shown in FIGS. 2 and 3, the lid 44 when engaged with the base 12, does not have any portion that is in a plane defined by the lower, suction-providing edge 60 of the lower rim 14. Similarly, the lid 46 when engaged with the base 12, does not have any portion that is in a plane defined by the upper, suction-providing edge 62 of the upper rim 32.

In use, each lid 44, 46 would be pressed into the vessel 10 below the respective bead 48, 52 until it rests on the respective lid-receiving portion and on the respective rib(s) 38 or shelf or ridge 56, 58. The lids 44, 46 are identical so each can be used for sealing the lower or upper chamber space 40, 42. Pressing of lid 44 is effective to cause the lid 44 to be trapped on the lid-receiving portion between the ribs 38 around the lower chamber space 40 and the annular bump or bead 48. Similarly, pressing of lid 46 is effective to cause it to be trapped on the lid-receiving portion between the ribs 38 around the upper chamber space 42 and the bead 52.

The presence and use of both lids 44, 46 is not essential to the invention and the vessel 10 may be used without one or both lids 44, 46. However, for use as a storage unit, both lids 44, 46 would be provided to enable storage of material in both the lower and upper chamber spaces 40, 42. Obviously, removal of one lid 44, 46 enables the respective chamber space to be accessed for a variety of different purposes, including, storing items therein, retrieving items stored therefrom, packaging items into the chamber space, and placing items to be served into the chamber space.

Vessel 10, including the vessel base 12 and lids 44, 46 can be manufactured to be one-time use (i.e., with thin walls and from cheap plastic) or re-usable as in the case of Tupperware® or Gladware® or Rubbermaid® and the like. Vessel 10 can be upper-rack dishwasher safe as well as microwave safe. This is a choice of application and choice of thermoplastic substrate. One time use can be designed for sale in a retail supermarket package or Home Depot hardware package filled with product (food, hardware, etc.) The advantage over conventional blister packs is these perform suction as well as carry product. If produced very cheaply with a thin wall, it might have limited secondary use. If, on the other hand, the vessel 10 is made more sturdily, it can have practical after use. Reusable packaging has great advantages insofar as there is a further incentive to buy the contents. As such, it can be marketed as a package with product, or sold individually as a container, etc.

Vessel 10 is also designed to enable multiple compartments to be formed in each of the upper and lower chamber spaces 40, 42. To this end, a container support structure or means is provided for each of the chamber spaces 40, 42. As an example of such means, the projecting rims 34, 36 are formed, one on each side of the intermediate wall 24 (see FIG. 3). Each rim 34, 36 is designed to engage with a lower rim 64, 66 of a respective container 68, 70, with the lower rim 64, 66 being retained inward of the respective rim 34, 36 (see FIGS. 2 and 4). As such, containers 68, 70 do not move once placed into engagement with the intermediate wall 24 and sandwiched between the intermediate wall 24 and the lids 44, 46.

Each container 68, 70 also includes a lower wall 72 and an annular wall 74.

To improve retention of containers 68, 70, the inner sides of the lids 44, 46 are also provided with projecting rims 76, 78 which are designed to be positioned inward or outward (not shown) of the upper edges of annular walls 74 (see FIG. 2). As shown in FIGS. 1-3, the containers 68, 70 have a generally cylindrical shape with the lower rims 64, 66 and annular wall 74 having a circular shape. However, other shapes of rims and containers are envisioned. In addition, other cooperating retaining structure or means for retaining the containers 68, 70 in engagement with both the base 12 and the lids 44, 46 are envisioned and encompassed within the scope of the invention, Such container retaining means may have any form known to those skilled in the art.

Moreover, the presence of containers 68, 70 on the base 12 assist in the maintenance of suction by the vessel 10 by transference.

Each of containers 68, 70 is selectively engaged with the base 12, depending on, for example, the number of separate items the users wants to store in the vessel 10. If only two items, the user does not require any containers 68, 70 and can store one item in chamber space 40, close the chamber space 40 using lid 44, place the other into chamber space 42 and then close the chamber space 42 using lid 46. If three items, the user places container 68 into engagement with the base 12, and then fills container 68, the space around container 68 in the upper chamber space 40, closes chamber space 40 using lid 44, then places items into the lower chamber space 42 and closes chamber space 42 using lid 46. If four items, the user places containers 68 into engagement with the base 12, and then fills container 68, the space around container 68 in the upper chamber space 40, closes chamber space 40 using lid 44, then places container 70 into engagement with the base 12, fills container 70 and the space around container 70 in the lower chamber space 42, and then closes chamber space 42 using lid 46.

FIG. 4 shows an exploded view of the vessel 10 and the engagement of the various parts. Containers 68, 70 and are located on either side of the base 12, and then the lids 44, 46 are engaged with the base 12 to sandwich the containers 68, 70 between the intermediate wall 24 of the base 12 and the lids 44, 46, respectively, 36 and 76 trap 70. 76 seals in the contents of container 70. This prevents spill-over of the contents.

Figure 5:
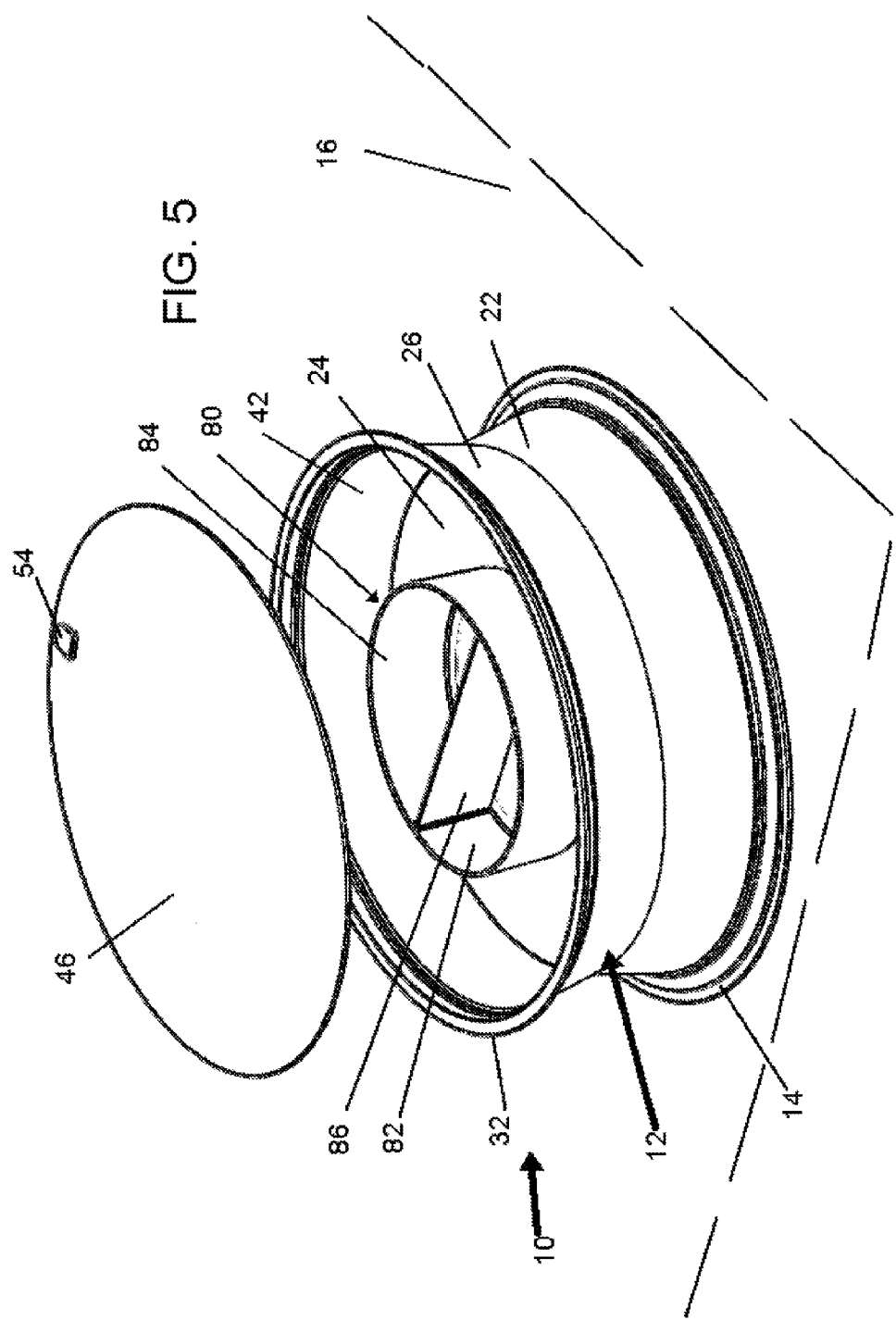
FIG. 5 is a perspective view of the vessel shown in FIG. 1 with an alternative interior removable vessel.

FIG. 5 shows an alternative to containers 68 and 70, namely a container 80 that itself defines two separate compartments 82, 84. A partition wall 86 between compartments 82, 84 is formed to avoid interfering with the rims 76, 78 on the inner sides of the lids 44, 46, respectively. For example, the height of the partition wall 86 may be slightly less than the height of the annular wall 74 (In FIG) of the container 80. If it's liquid, it may be more ideal if the same height so it engages with the lid to form more of a seal. It is possible for the raised rib on the lid to be two "D" shapes to fit into the two separate compartments and thus seal in the contents. Or it can be one round raised rib to go over the container to seal in the contents. Both function essentially the same.

A vessel in accordance with the invention may be sold as a kit with base 12, one or more of containers 68, 70 and one or more of containers 80. Thus, the kit may include one container 68 and one container 80, or two containers 80, or containers 68 and 70. Any number of containers 68, 70 and containers 80 may be provided. Also, it is possible to form another insertable container with three separated compartments, or four, or any number of separate compartments in the same manner as container 80 is formed, e.g., using one or more partition walls.

It is also possible to construct the container support means to support two containers in the same chamber space 40, 42. In this case, two half-round containers may be formed, and can be used together or independently by engaging with the rims on the intermediate wall 24 and the lids 44, 46.

Instead of having one or more removable containers 68, 70, 80, it is possible for the base 12 to be formed with an integral partition in one or both of the upper and lower chamber spaces 40, 42. Such an integral partition may be circular and enables two different foods or objects to be placed in the upper and/or lower chamber space 40, 42. The lid 44, 46 would form a snug fit over the chamber space 40, 42, respectively, so that when in place, the lid 44, 46 prevents the food in one compartment from mixing with the food in the other compartment.

Figure 6:
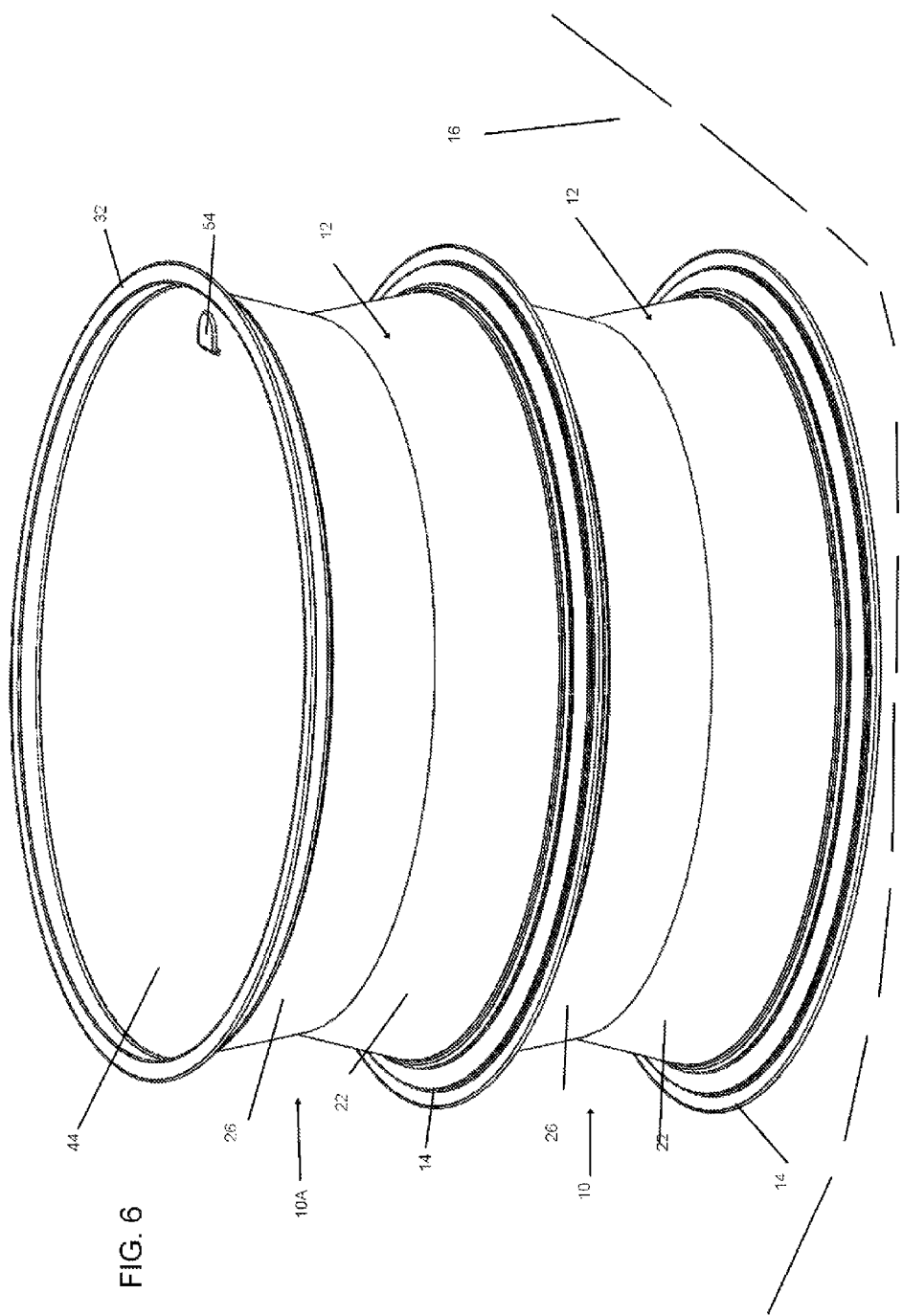
FIG. 6 is a perspective view of two of the vessels shown in FIG. 1 stacked and engaged with one another.
Figure 7:
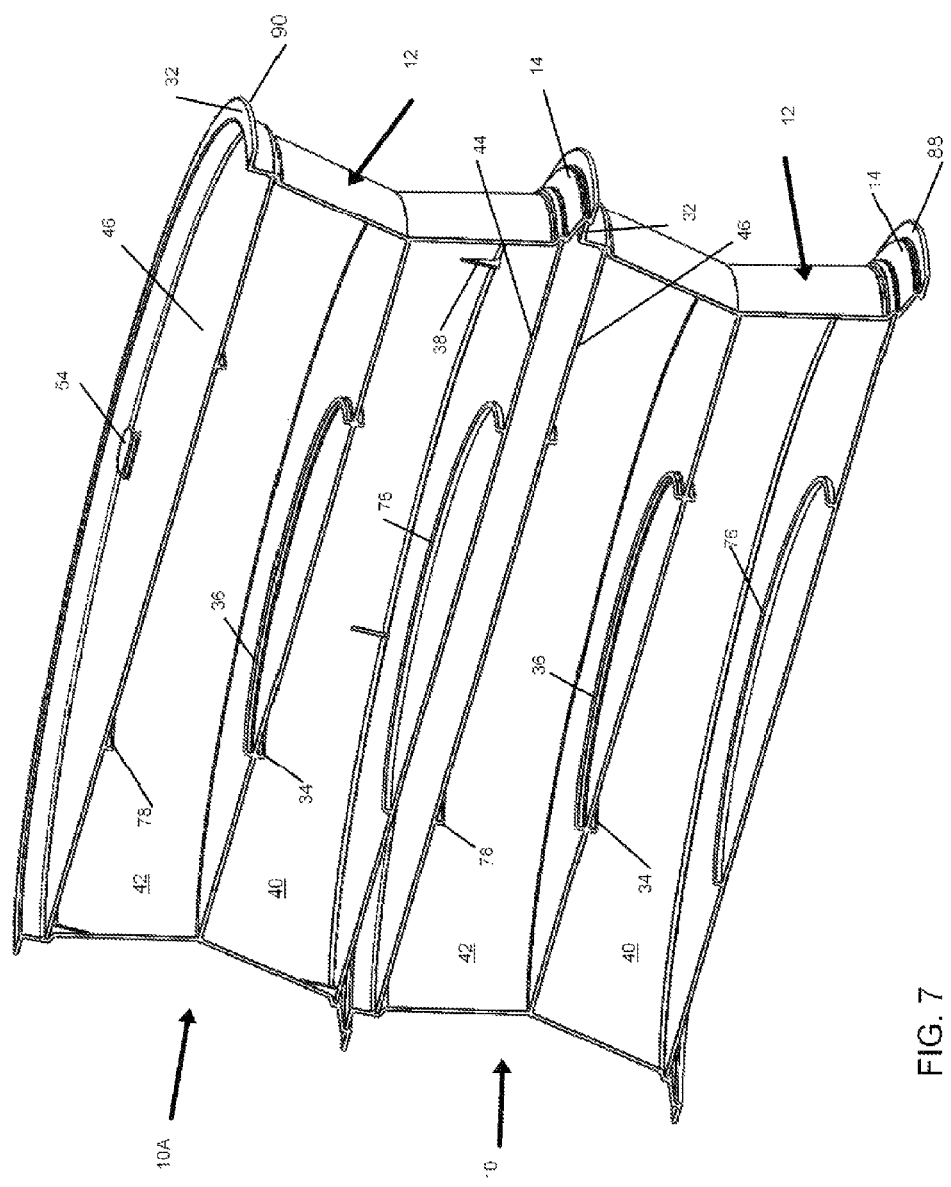
FIG. 7 is a cross-sectional view of the stack of vessels shown in FIG. 6 without any interior vessels.

Another important feature is the stackability of the vessel 10 (see FIGS. 6 and 7). To facilitate stackability, the lower rim 14 is provided with an inner peripheral surface 88 that is the same as or only slightly larger than the outer peripheral surface 90 of the upper rim 32 (see FIG. 2). This enables a second vessel 10A to be stacked on top of vessel 10 (vessel 10A having the same or a similar construction as vessel 10). Even further, yet another vessel 10 may be stacked on top of vessel 10A, and so on. In this manner, a stack of a plurality of vessels 10 may be formed. Such a stack would be particularly useful for storing various objects, such as different toppings for pizza or ice cream in a restaurant. Formation of such a stack would also be helpful for packaging and transportation purposes. Moreover, by storing objects in vertically stacked vessels, less horizontal shelf space is needed for storage of those objects since two, three, four or more vessels may be stacked in a single stack and occupy the horizontal space of a single vessel. This provides a significant advantage as opposed to a situation where two, three, four or more vessels must each be placed on and in contact with the same horizontal shelf. Also, the suction between adjacent vertically stacked vessels will likely contribute to the vertical stability of the stack.

In a more general sense, the lower and upper rims 14, 32 are provided with cooperating mating structure. That is, when the lower rim 14 is provided with or configured as male mating structure, the upper rim 32 is provided with or configured as a female mating structure. The male and female mating structures are configured to provide an interference fit or a snap-fit to one another to provide for a secure attachment of one vessel 10 to another when a stack of vessel is formed. Nevertheless, although providing a male mating structure on one side of the vessel 10 and a female mating structure on the other side of the vessel 10 is a preferred embodiment, it is contemplated that one vessel may be provided with two male mating structures or a vessel may be provided with two female mating structures. The different types of vessels may include or be integrated with indicia indicative of the type of mating structures thereon.

Vessel 10 may be manufactured by molding as a one-piece part using currently known injection-molding machines. Such machines can mold the vessel 10 in various colors and sizes. The least costly approach would be to mold the vessel 10 in a single color and size. A transparent color may be preferred in embodiments wherein a water seal is used.

In an alternative manufacturing technique, the vessel may be constructed from two parts. The embodiment shown in FIGS. 8-14 is an example of a vessel 100 including a vessel base 102 made from two parts 104, 106. The two vessel parts 104, 106 may be separately manufactured and can be attached to one another for use.

Figure 8:
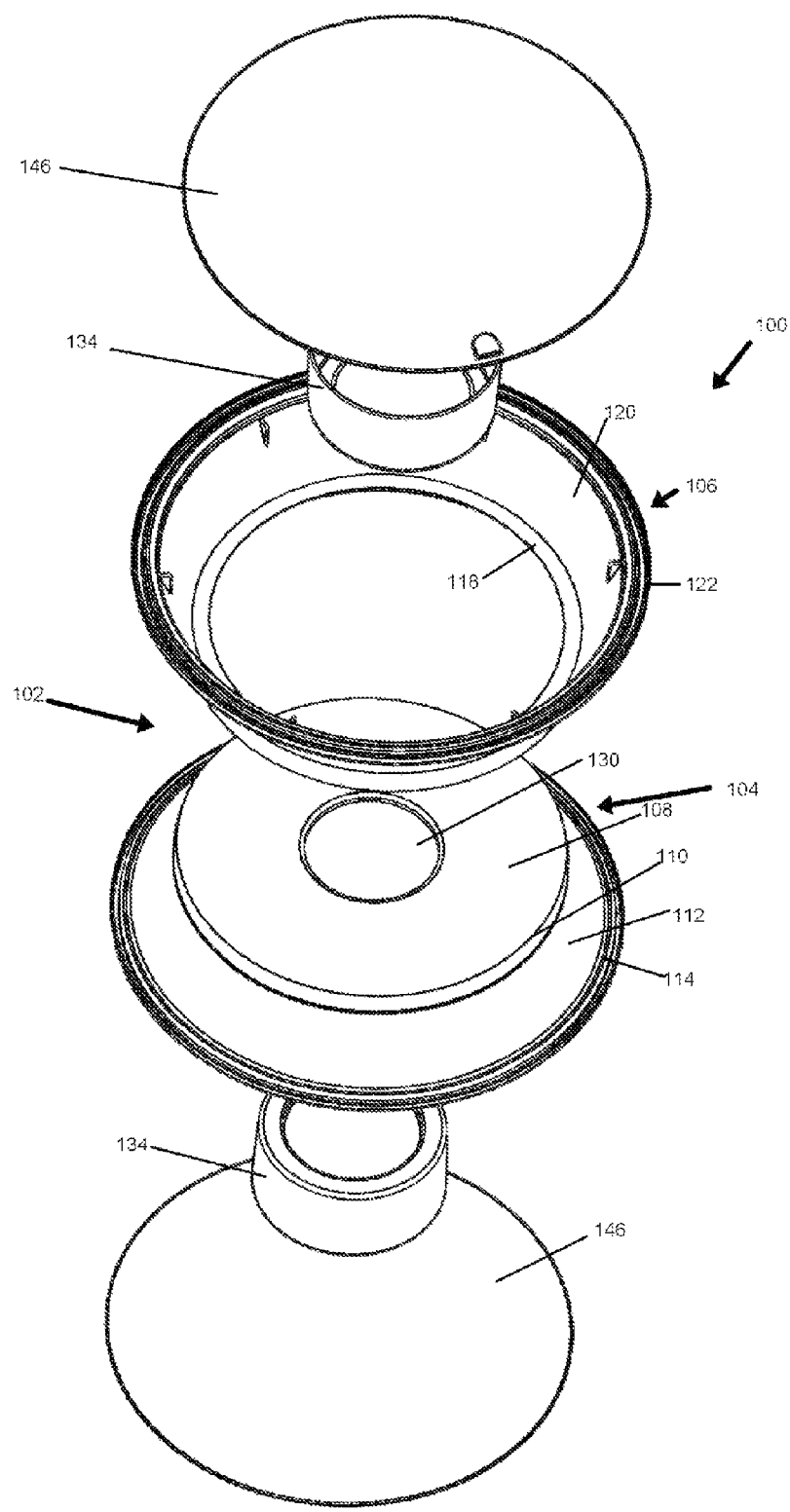
FIG. 8 is an exploded, perspective view of a second embodiment of a vessel in accordance with the invention.
Figure 9:
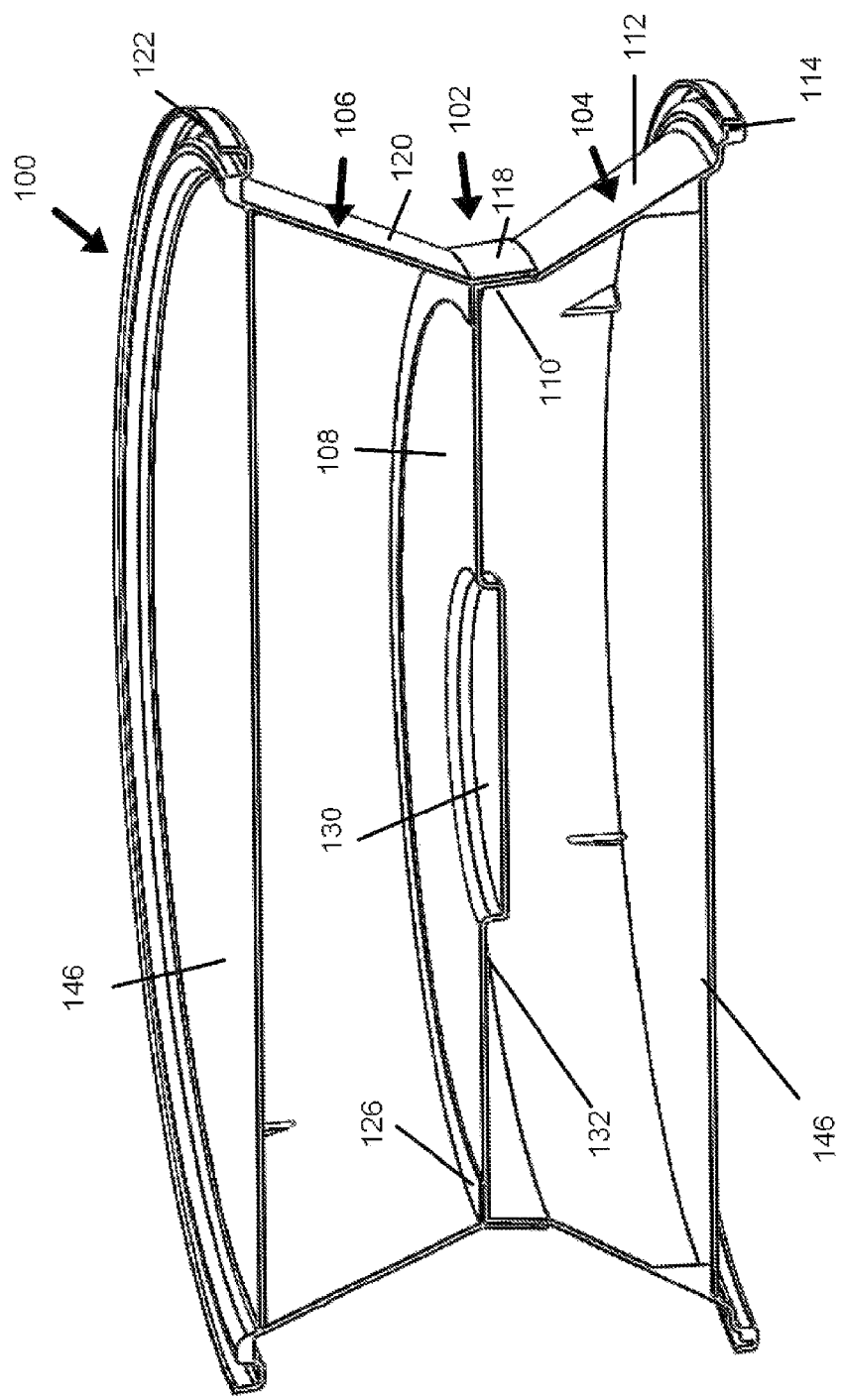
FIG. 9 is a cross-sectional view of the vessel shown in FIG. 8 with the lids removed.
Figure 10:
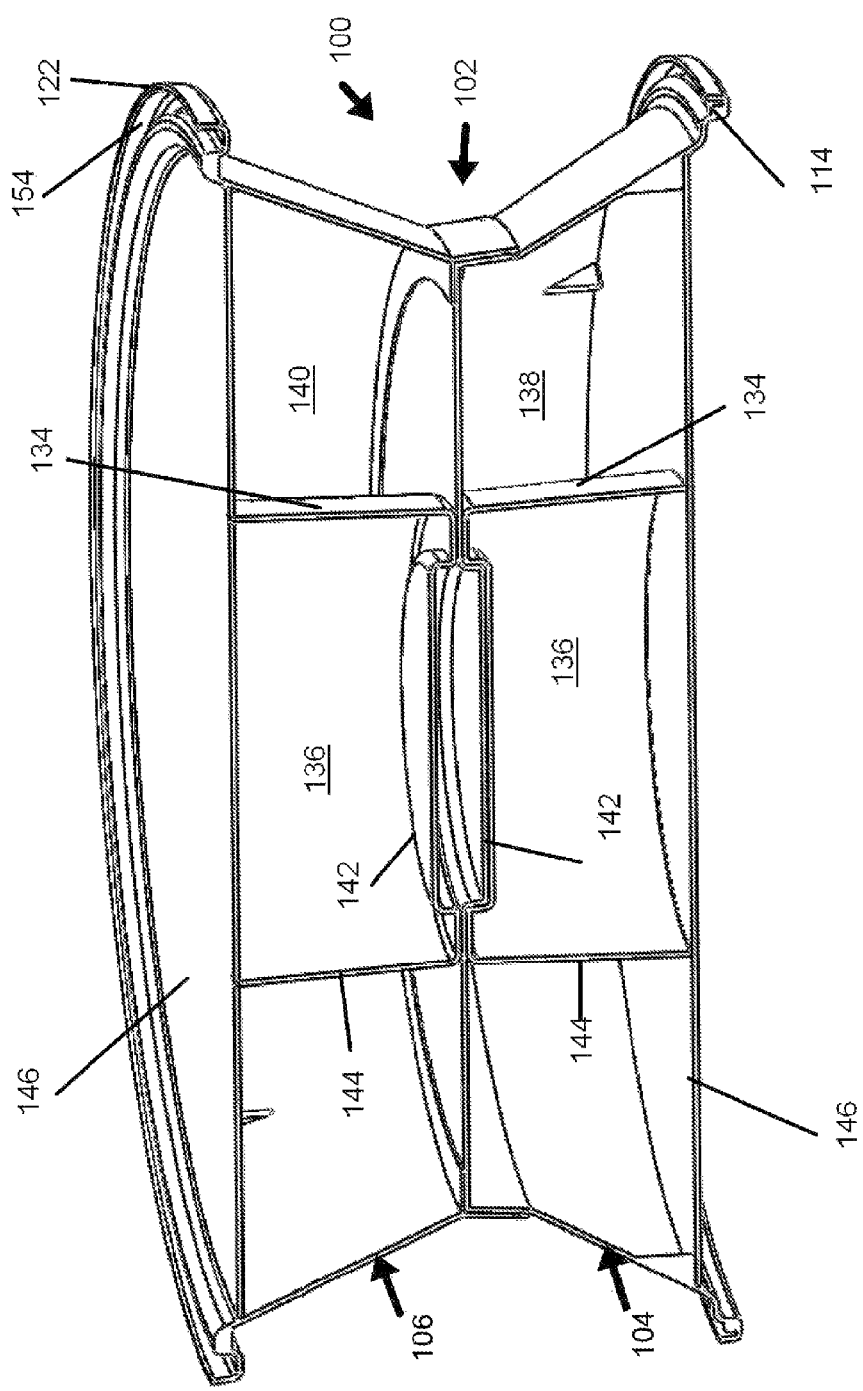
FIG. 10 is a cross-sectional view of the vessel shown in FIG. 8 with the lids engaged, with interior containers therein and without items stored therein.

A first vessel part 104 shown in FIG. 8 is a "full" vessel including an intermediate wall 108, an annular wall 110 extending upward from the outer edge of the intermediate wall 108, an outwardly tapering side wall portion 112 extending from the upper edge of the annular wall 110 and a seal rim 114 at the upper edge of the tapering wall 112 (see FIGS. 9 and 10). Vessel part 104 may be molded in one-piece with a thin wall thickness from polypropylene. At least a portion of the seal rim 114 is molded to enable a suction seal to be provided thereby when pressed against a flat surface. Seal rim 114 also has a generally U-shaped cross-section to enable mating with a complementary portion of the second vessel part 106 (described below). The vessel part 104 is also provided with a circumferential groove 116 in the outer surface of the annular wall 110 (see FIG. 11).

Vessel part 104 may also be provided with the same lid-supporting means and lid-engaging means as described above.

Vessel part 106 is an open hollow vessel part that defines an annular wall 118 of larger cross-section than annular wall 110, an outwardly tapering side wall portion 120 extending from a lower edge of the annular wall 118, and a seal rim 122 at the lower edge of the tapering wall portion 120 (see FIGS. 9 and 10). The vessel part 106 is also provided with a circumferential bead 124 in the inner surface of the annular wall 118 that fits into the circumferential groove 116 in the annular wall 110 of the vessel part 104 to thereby enable mating of vessel parts 104, 106 together (see FIG. 11).

Vessel part 106 also includes a seat 126 that projects radially inward from an area around a juncture of the annular wall 118 and wall portion 120, either on the annular wall 118 on the wall portion 120 or partly on both. Seat 126 thus has an annular form. Seat 126 optionally has a soft durometer overmolded or snap-in/snap-on gasket thereon (shown in FIGS. 21 and 22) to ensure an air-tight and water-tight first when vessel parts 104, 106 are attached together. This gasket may be made from a rubberized thermoplastic material. Vessel 106 does not require the gasket and may function comparably without the gasket. A snap seal type of attachment of vessel parts 104, 106 may perform an equivalent function as the gasket.

At least a portion of the seal rim 122 is molded to enable a suction seal to be provided thereby when pressed against a flat surface. This portion may be the flat area more proximate to the center of the vessel base 102, with a remaining portion of the seal rim 122 having a U-shaped channel 154.

Vessel parts 104, 106 may be manufactured such that the wall portions 112, 120 defined thereby have substantially the same heights (as shown). Although they may also be manufactured to provide different heights and thus two different height chambers defined by the base 102.

Figure 11:
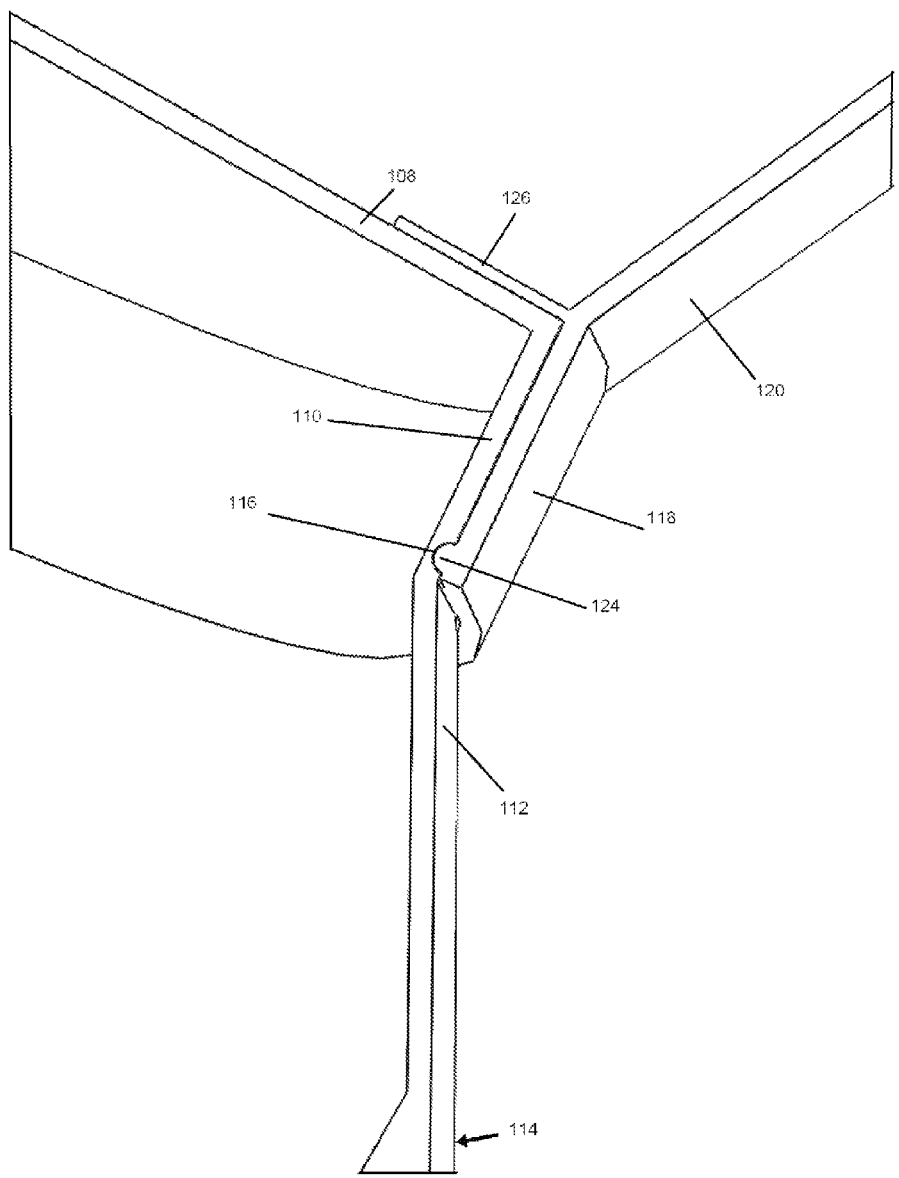
FIG. 11 is an exploded view of the mating structure of two vessel parts of the vessel shown in FIG. 8.

Assembly of the vessel base 102 entails bringing vessel parts 104 and 106 together so that the intermediate wall 108 is against the seat 126, while causing the bead 124 to fit into the circumferential groove 116 (see FIG. 11). In this manner, a secure attachment of the vessel parts 104, 106 to one another is provided. Instead of the cooperating circumferential groove 116 and bead 124, other attachment structure or means may be provided, and such attachment structure known to those skilled in the art is encompassed within the scope of the invention. Such attachment structure would include one part on the vessel part 104 and another part on the vessel part 106 that cooperate to prevent unforced separation of the vessel parts 104, 106 from one another.

Advantages of the formation of vessel 100 from vessel parts 104, 106 are that the vessel 100 is easier to clean because the vessel parts 104, 106 can be separate and then cleaned separately and re-assembled after cleaning. Further, the molding process is likely to be simpler when molding vessel parts 104, 106 than when molding a single piece. Among other things, there are fewer undercuts and simpler parting lines which ease the molding process. Both vessel parts 104, 106 may be formed from thin wall polypropylene, and preferably sufficiently resilient to provide the suction capability at their upper and lower edges, respectively. Another advantage is both part 104 and 106 can be molded in different colors for decorative mix-and-match purposes. One can be transparent and one can be solid, for example.

From the perspective of the vessel part 104 when seal rim 114 is oriented upward, intermediate wall 108 includes an optional raised area 130 surrounded by a sunken area 132 to allow for registration with a partitioning wall or vessel 134 that defines another storage compartment 136 (see FIG. 10). A raised area may be formed on the upper side of the intermediate wall 108 and/or on the lower side of the intermediate wall 108. When a raised area is formed on both sides, and two mating vessels 134 are provided, there will be a total of four compartments, two defined in a lower chamber space 138 and two defined in the upper chamber space 140 of the vessel 100.

As shown in FIG. 10, the vessel 134 has a lower wall 142 that conforms generally to the shape of the raised area 130 and a part of the surrounding sunken area 132, and an annular wall 144. The height of the annular wall 144 is slightly less than the height of the chamber spaces 138, 140 to avoid interference with the lids 146. An advantage for the vessel 100 is the ability to use vessel part 104 alone as a simple storage container from time-to-time. This has a practical advantage over the unibody embodiment shown FIGS. 1-7. Another advantage to the two-part vessel 100 is storage. Without the lids and inner containers, a plurality of vessel parts 104 can nest on each other. Likewise, a plurality of vessel parts 106 can in a similar fashion do the same. To nest, a certain amount of draft is required. If the inner containers have sufficient draft, they can nest on one another as well. Finally the lids 146 can be stacked on top of one another.

In a more general sense, the vessel 100 includes interior container support structure or means that support an interior vessel or container to thereby partition the chamber space defined on each side of the intermediate wall 108 when the vessel parts 104, 106 are together. These means are not limited to the raised area 130 and surrounding sunken area 132 and other support means known to those skilled in the art are encompassed within the scope of the invention.

Figure 12:
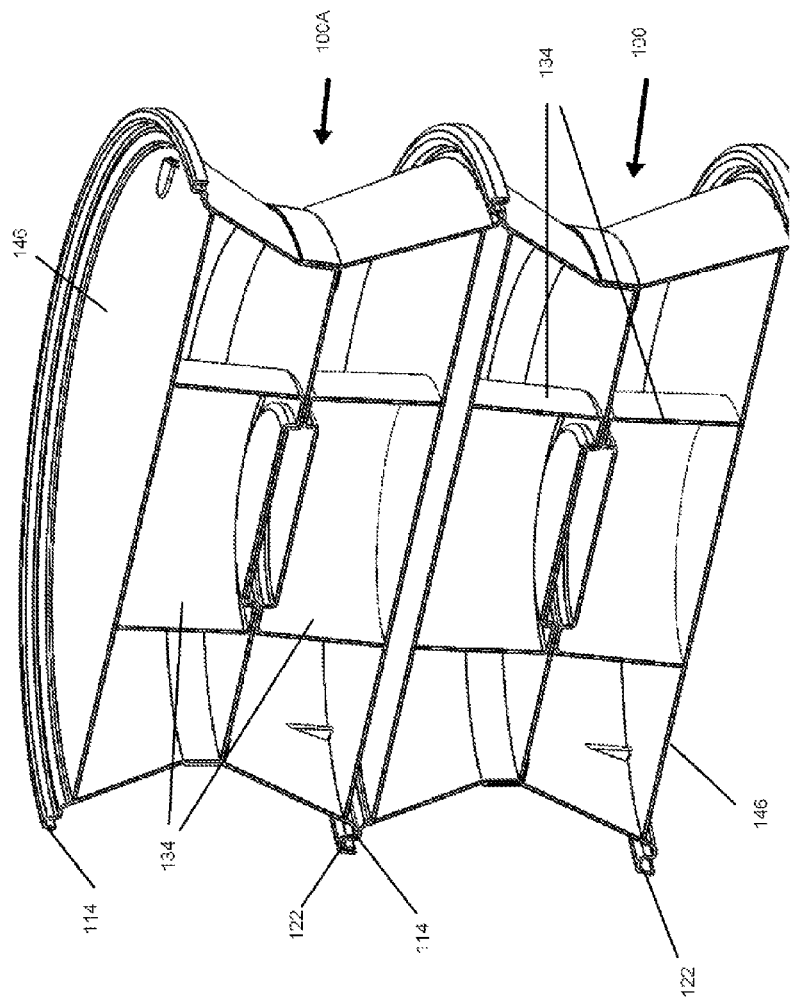
FIG. 12 is a cross-sectional view of a stack of two vessels shown in FIG. 8.

As shown in FIG. 12, vessel 100 may be stacked by engaging the seal rim 114 or one vessel to the seal rim 122 of another vessel 100A, or more specifically, inserting the U-shaped seal rim 114 into the U-shaped channel portion of seal rim 122. Thus, each seal rim 114, 122 serves the dual functions of enabling suction to be provided when pressed against a surface against which suction can be generated, and to enable stackability of multiple vessels 100 together.

Figure 13:
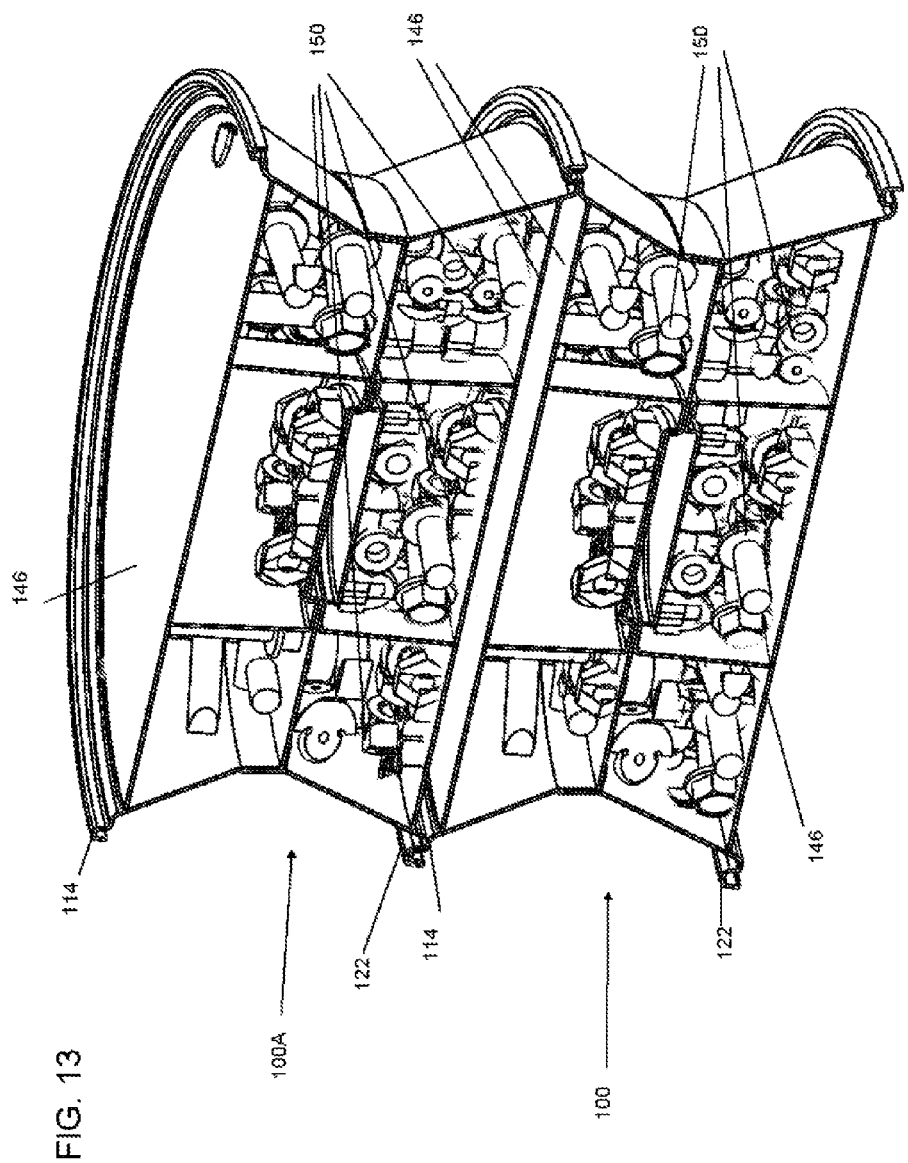
FIG. 13 is another cross-sectional view of a stack of two vessels shown in FIG. 8 with interior vessels and an assortment of hardware stored in all of the compartments defined by the vessels.

FIG. 13 is another cross-sectional view of two of the vessels 100 shown in FIG. 8, the upper one now designated 100A, which are stacked one on top of the other. Vessels 100, 100A each include optional interior vessels 134 and an assortment of hardware products 150, such as bolts, screws, nuts, stored in all of the compartments defined by the vessels 100, 100A.

Figure 14:
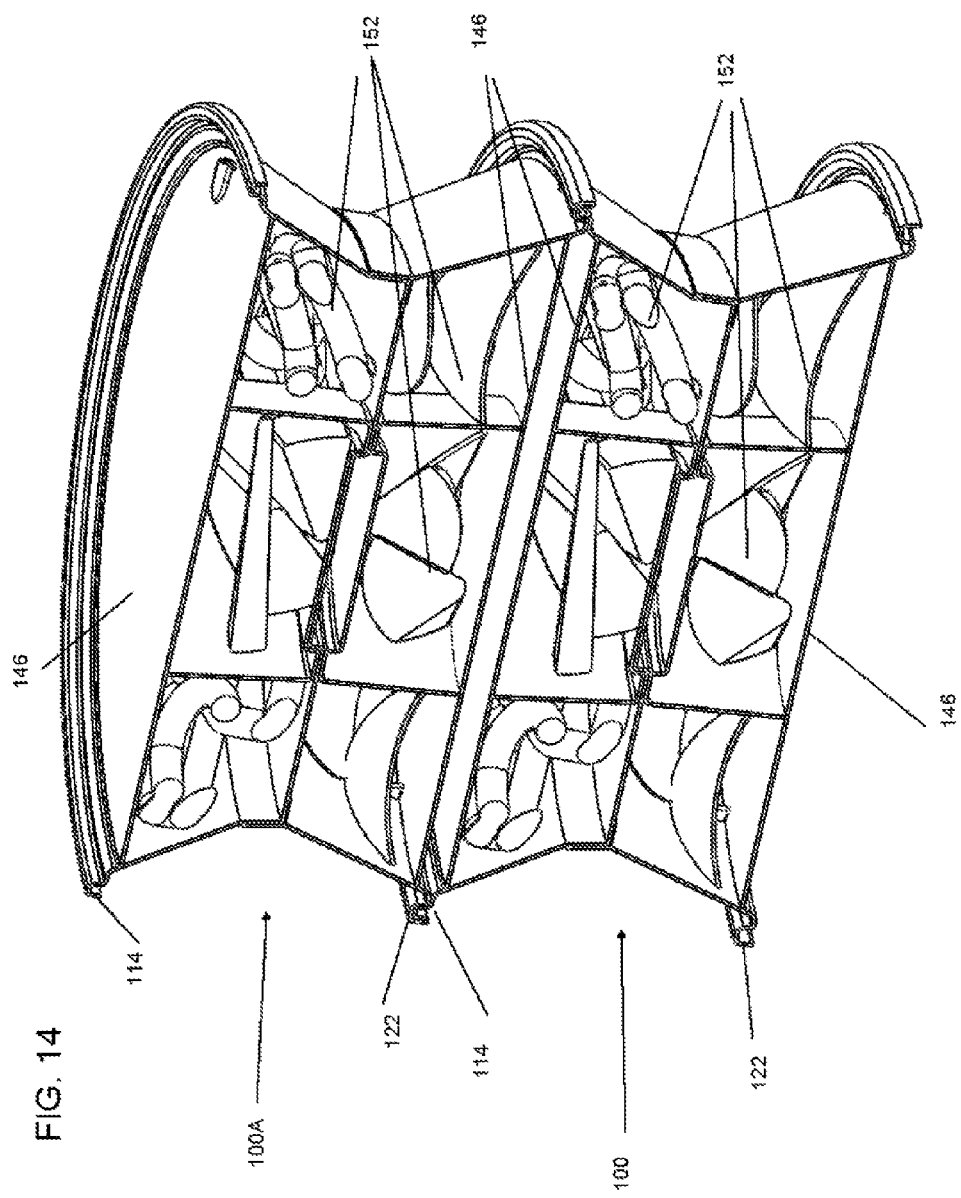
FIG. 14 is another cross-sectional view of a stack of two vessels shown in FIG. 8 with interior vessels and an assortment of food stored in all of the compartments defined by the vessels.

FIG. 14 is another cross-sectional view of two of the vessels shown in FIG. 8, designated 100, 100A, with optional interior vessels 134 and an assortment of food 152 stored in all of the compartments defined by the vessels 100, 100A.

Vessel 100 may have any desired shape. A preferred shape is circular or round because the suction providing effect is best when circular lower and upper seal rims 114, 122 are present. One reason might be because the pressing force to obtain the suction spreads out proportionally for a circular vessel 100, but would not likely for a square, rectangular, or hexagonal vessel. Nevertheless, although a circular vessel is likely optimal, the invention is not limited to a circular vessel and encompasses other shapes of vessels.

There are numerous uses for the vessels 10, 100. As an example, it is possible to carry two different meals or two different snacks when travelling, one in each of the lower and upper chamber spaces. The meals might be for the same person at two different times, or for two different people at the same time, with one eating after the other since only one chamber space is available when the vessel 10, 100 is horizontally oriented.

Vessel 10, 100 is ideal for parents to use for feeding babies, toddlers and children. It is also good for feeding pets, with the vessel 10 containing water in one chamber space and feed in other chamber space. It can also be used for hospitals and other places for feeding sick, injured or handicapped people, since it can be temporarily adhered to a table, tray table or other horizontal surface. Other applications involve retail food packaging, hardware packaging (see FIGS. 13 and 14).

Referring now to FIGS. 15-17, another embodiment of a vessel in accordance with the invention is designated generally as 160 and includes a unitary vessel base 162 that includes an intermediate wall 164, a lower side wall 166, and an upper side wall 168. Intermediate wall 164 and lower side wall 166 define a lower chamber space 170, while intermediate wall 164 and upper side wall 168 define an upper chamber space 172. A seal rim 174 is situated at the lower edge of the lower side wall 166 and a seal rim 176 is situated at the upper edge of the upper side wall 168. Seal rims 174, 176 enable one vessel 160 to be stacked to another similar vessel while also provided suction. Thus, seal rims 174, 176 may have any of the forms described above.

As shown, the upper seal rim 176 has an outer peripheral surface 180 that is equal to or slightly smaller than an inner peripheral surface 178 of the lower seal rim 174 so that outer seal rim 176 can fit within the lower seal rim 174 when two vessels 160 are mated to one another (see FIG. 17). Lids (not shown) may engage with lid-receiving portions defined on the inner surfaces of the side walls 166, 168 to retain lids.

FIG. 17 shows only the upper part of a lowermost one of the vessels 160 in a potential stack of vessels 160 that is designed to mate with the lower part of an adjacent, uppermost one of the vessels in the same stack. The remaining portions of the vessels 160 in FIG. 17 are not shown.

The embodiment shown in FIGS. 15-17 thus represents the general concept of a multi-compartment vessel having a common intermediate, preferably flexible wall, with suction chambers on both sides and sealing surfaces of the rims of side walls defining the two suction chambers. The variations described above in the vessels 10, 100 may also be used for vessel 160.

The present application therefore encompasses a utensil, container, package, vessel or other term for an item capable of containing, retaining, storing, holding items. The vessel includes a base that defines a plurality of compartments and by providing suction-generating means on both sides, is capable of being attached by suction to a horizontal surface in two orientations. These suction-generating means may be integrated into the rims of the vessel base. In one orientation, at least one chamber would be usable when a lid or cover thereof is removed, and in the other orientation, at least one other chamber would be usable when a lid or cover thereof is removed. Thus, depending on which chamber or contents therein are sought to be used, the vessel would be oriented and attached by suction to the horizontal surface, As an example of use, a parent may give the vessel to their child for lunch and put pasta in one compartment and cut vegetables in the other. When the child wants to eat the pasta, they would orient the vessel such that the pasta-containing compartment faces upward, place the vessel on a horizontal surface and optionally press it against the surface to form a suction-seal and then remove the lid and eat the pasta. When the pasta is finished, or the child wants vegetables, they would close the pasta compartment with the lid, inverted the device such that the vegetable-containing compartment faces upward, place the vessel on a horizontal surface and optionally press it against the surface to form a suction-seal and then remove the lid and eat the vegetables.

To increase the number of different items that can be placed into the base, the base may be provided with connecting means for releasably or permanently connecting one or more sub-vessels thereto. These sub-vessels may be small cylindrical containers that include structure on their lower and/or upper surface that engages with complementary or mating structure on an intermediate wall of the base and/or the lids to secure the containers in position between the intermediate wall of the base and the lids when the lids are in place. As such, the contents in the space between the container and the peripheral wall of the base are not smushed. With such sub-vessels, a salad dressing for example, may be placed into the sub-vessel and surrounded by a compartment full of cut vegetables.

A further advantage of the vessels in accordance with the invention is their stackability which allows for easy storage of the vessels, when either full or empty. The same structure that enables the stackability may also constitute all or part of the suction-generating means.

FIGS. 18-22 show other vessels 200, 300 in accordance with the invention each of which is made from two parts like the embodiment shown in FIGS. 8-14. Vessels 200, 300 each include a vessel base 202 made from two parts 204, 206. The two vessel parts 204, 206 may be separately manufactured and can be attached to one another for use. The main difference between vessel 200 and vessel 300 is the presence of notches 262 on vessel 200 but not on vessel 300. The number and placement of lids and interior compartments for vessels 200 and 300 is also different, but these are optional features and can be provided in any combination for vessel 200 as well as for vessel 300.

Figure 21:
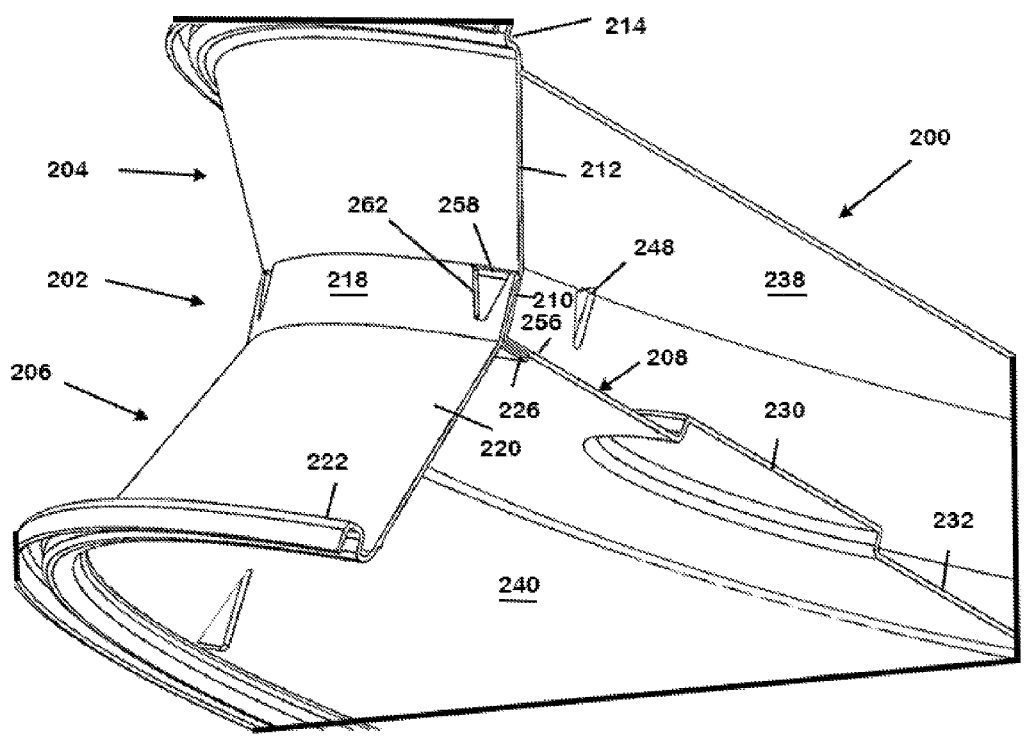
FIG. 21 is a partial cross-sectional view of the vessel base of the vessel shown in FIG. 18.

The first vessel part 204 is a "full" vessel including an intermediate wall 208, an annular wall 210 extending upward from the outer edge of the intermediate wall 208, an outwardly tapering side wall portion 212 extending from the upper edge of the annular wall 210 and a seal rim 214 at the upper edge of the tapering wall 212 (see FIGS. 19-21). Vessel part 204 may be molded in one-piece with a thin wall thickness from polypropylene. Seal rim 214 also has a generally U-shaped cross-section to enable mating with a complementary portion of the second vessel part 206 (described below). The vessel part 204 may also be provided with a circumferential groove 258 in the outer surface of the annular wall 210 (see FIG. 21). Vessel part 204 may also be provided with the same lid-supporting means and lid-engaging means as described above, e.g., ribs 248.

At least a portion of the seal rim 214 may be molded to enable a suction seal to be provided thereby when pressed against a flat surface. However, this type of molding is not required and the seal rim 214 may be formed without the capability to form a suction seal.

Figure 22:
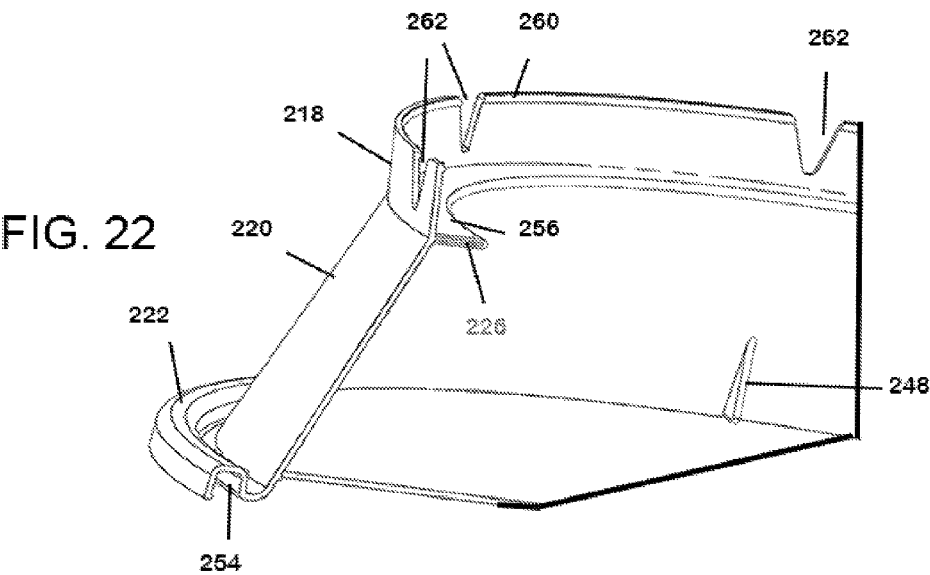
FIG. 22 is a partial cross-sectional view of one part of the vessel base of the vessel shown in FIG. 18.

Vessel part 206 is an open hollow vessel part that defines an annular wall 218 of larger cross-section than annular wall 210, an outwardly tapering side wall portion 220 extending from a lower edge of the annular wall 218, and a seal rim 222 at the lower edge of the tapering wall portion 220 (see FIGS. 20 and 22). The vessel part 206 is also provided with a circumferential bead 260 in the inner surface of the annular wall 218 that fits into the circumferential groove 258 in the annular wall 210 of the vessel part 204 to thereby enable mating of vessel parts 204, 206 together.

Vessel part 206 also includes a seat 226 that projects radially inward from an area around a juncture of the annular wall 218 and wall portion 220, either on the annular wall 218 on the wall portion 220 or partly on both. Seat 226 thus has an annular form.

Seat 226 optionally has a soft durometer over-molded or snap-in/snap-on gasket 256 thereon (see FIGS. 21 and 22) to ensure an air-tight and water-tight fit when vessel parts 204, 206 are attached together. This gasket 256 may be made from a rubberized thermoplastic material. Gasket 226 may be made from a softer, more sealable durometer plastic material. Vessel 206 does not require the gasket 256 and may function comparably without the gasket 226. A snap seal type of attachment of vessel parts 204, 206 may perform an equivalent function as the gasket.

At least a portion of the seal rim 222 may be molded to enable a suction seal to be provided thereby when pressed against a flat surface. This portion may be the flat area more proximate to the center of the vessel base 202, with a remaining portion of the seal rim 222 having a U-shaped channel 254 that faces in a direction away from the vessel part 206 (see FIG. 22). However, this type of molding is not required and the seal rim 222 may be formed without the capability to form a suction seal.

Vessel parts 204, 206 may be manufactured such that the wall portions 212, 220 defined thereby have substantially the same heights (as shown). Although they may also be manufactured to provide different heights and thus two different height chambers defined by the base 202.

Assembly of the vessel base 202 from vessel parts 204 and 206 is essentially the same as that for vessel base 102. Advantages of the formation of vessels 200, 300 from vessel parts 204, 206 are essentially the same as those mentioned above for vessel 100. The same features, characteristics and functions of vessel 100 and its parts are also applicable to vessels 200, 300 and the corresponding parts.

From the perspective of the vessel part 204 when seal rim 214 is oriented upward, intermediate wall 208 includes a raised area 230 surrounded by a sunken area 232 to allow for registration with a partitioning wall or vessel 234 that defines another storage compartment 236 (see FIGS. 20 and 22). A raised area may be formed on the upper side of the intermediate wall 208 and/or on the lower side of the intermediate wall 208. When a raised area is formed on both sides, and two mating vessels 234 are provided, there will be a total of four compartments, two defined in a lower chamber space 238 and two defined in the upper chamber space 240 of the vessels 200, 300.

The vessel 234 has a lower wall 242 that conforms generally to the shape of the raised area 230 and a part of the surrounding sunken area 232, and an annular wall 244. The height of the annular wall 244 is slightly less than the height of the chamber spaces 238, 140 to avoid interference with inner lids 246 that rest on an inner lid supporting structure. The inner lid support structure comprises a plurality of individual support ribs 248 spaced around the circumference of the inner surface of each of the inwardly tapering portions 212, 220.

Figure 26:
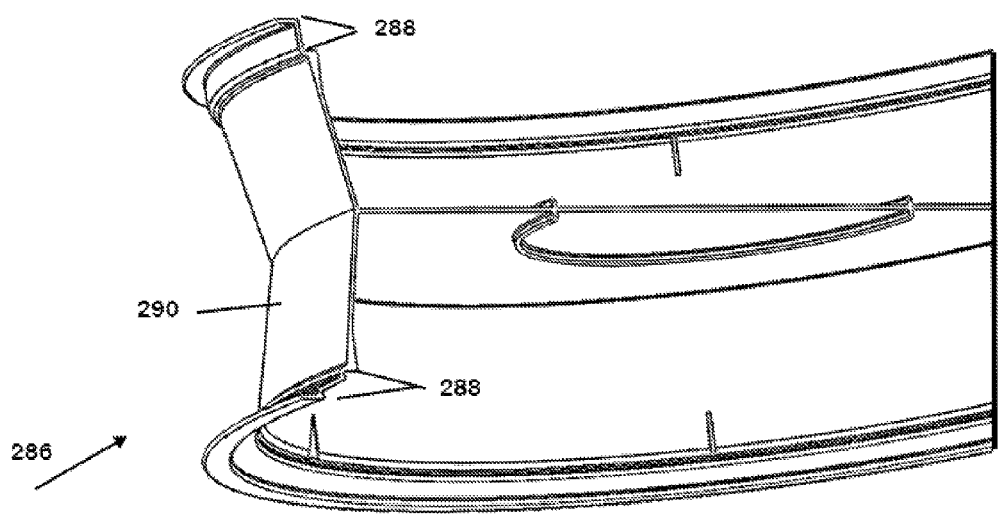
FIG. 26 is a cross-sectional view of a vessel similar to the vessel shown in FIGS. 1-7.

In a more general sense, the vessels 200, 300 may each include interior container support structure or means that support an interior vessel or container to thereby partition the chamber space defined on each side of the intermediate wall 208 when the vessel parts 204, 206 are together. These means are not limited to the raised area 230 and surrounding sunken area 232 and other support means known to those skilled in the art are encompassed within the scope of the invention. For example, FIG. 26 shows a simpler registration of interior storage compartments, namely, by means of an annular rim or circular projection on both sides of the intermediate wall that can mate with a circular rim of an interior storage container (discussed above with reference to annular rims 34, 36 in FIGS. 3 and 4 above). If interior compartments are not desired or required, the circular projection can be eliminated and the intermediate wall would become a substantially flat wall.

Differing from vessel 100, vessels 200, 300 each also include outer lids 250, 252 that releasably connect to the seal rims 214, 222 (see FIG. 19). Each outer lid 250, 252 can have a number of different forms, only one of which is shown. Regardless of its form, each outer lid 250, 252 includes a mating rim 264 that is configured to mate with the seal rims 214, 222, i.e., it has a generally complementary structure to that of the seal rims 214, 222.

An important aspect of the invention is that the inner lids 246 and independent of the outer lids 250, 252 so that it possible to use only the inner lids 246, only the outer lids 250, 252 or both the inner and outer lids. This ability arises from the fact that the inner lids 246 are retained by the lid supporting structure, i.e., ribs 248 inward of the seal rims 214, 222 (see FIG. 19). Thus, the inner lids 246 do not interfere with the seal rims 214, 222, i.e., they do not overlie the seal rims 214, 222. Then, the outer lids 250, 252 can then engage with the seal rims 214, 222, respectively, without interference from the inner lids 246. When an outer and inner lid are provided on each side of the vessel base, a compartment 224 is formed between them (see FIG. 20). This compartment 224 may additional be used for storage.

Another feature of the vessel 200 is the formation of notches 262 in the annular wall 218 as shown in FIGS. 18, 21 and 22 (and which are not present in vessel 300). The notches 262 are spaced around the circumference of the vessel 200. Notches 262 ease the assembly of the vessel parts 204, 206 together by enabling the annular wall 218 to flex slightly outward when pressing the annular wall 210 of the vessel part 204 inward of the annular wall 218 of the vessel part 206. Instead of notches 262, any other interruption in the solid form of the annular wall 218 may be provided. The shape, number and location of the notches 218 are therefore not critical to the invention. One skilled in the art would be able to determine the proper size, location and shape of the interruptions to ease the assembly of the vessel parts 204, 206 together. It is pointed out that such notches 262 could also be provided for vessel 100 described above to ease its assembly.

Figure 23:
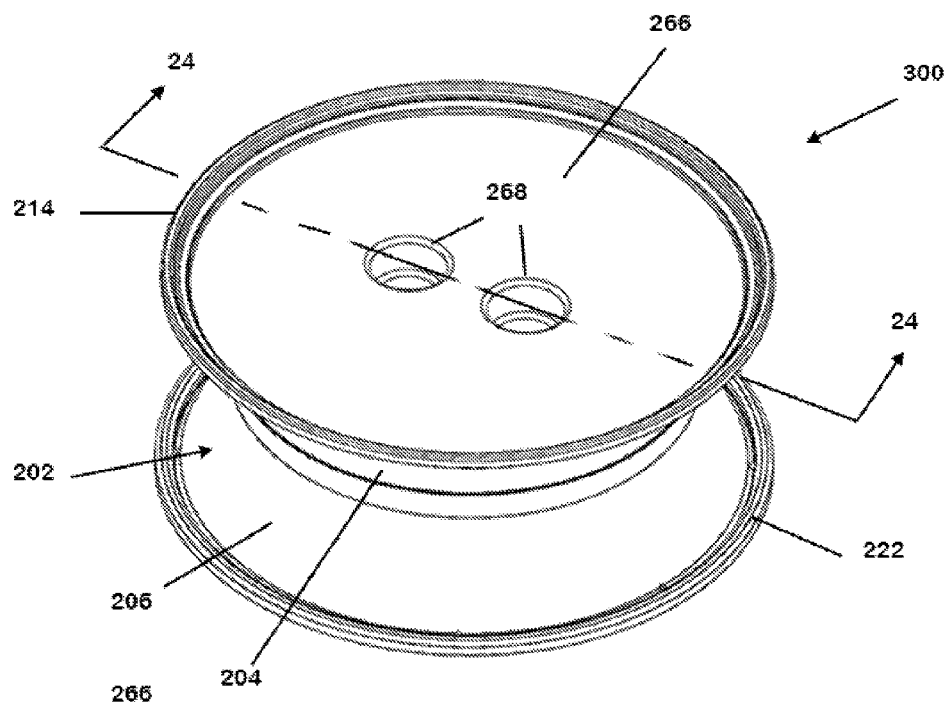
FIG. 23 is a perspective view of a vessel base for the vessel shown in FIG. 19 with an inner lid as an alternative or addition to the outer lids.
Figure 24:
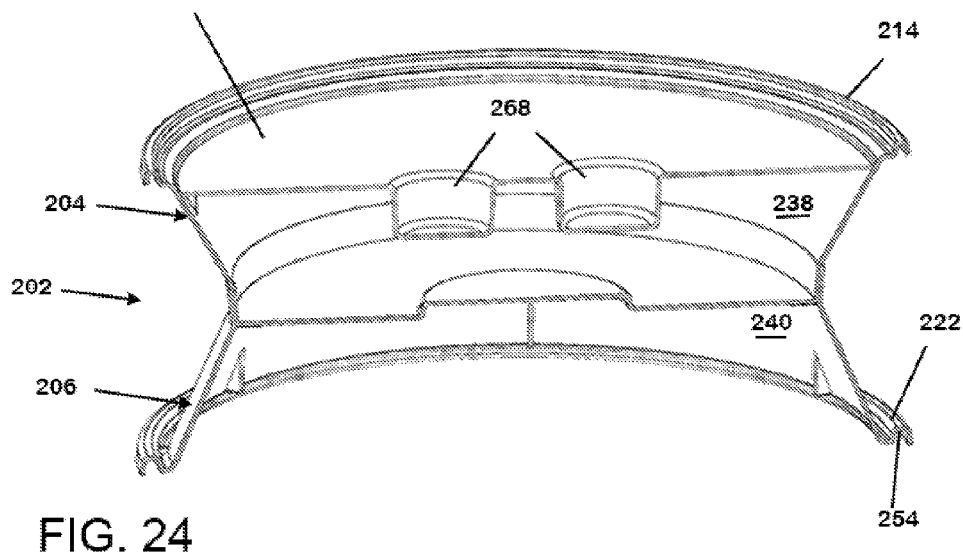
FIG. 24 is a cross-sectional view taken along the line 24-24 of FIG. 23.

FIGS. 23 and 24 show an alternative inner lid 266 for use with either of vessels 200, 300 (as well as possible use for any of the other vessels described herein). Although shown only closing the upper compartment 238, an inner lid may also be provided to close the lower compartment 240. Lids 44, 46 may be used interchangeably with lids 266. Inner lids 266 may be used instead of "outer" lids 250, 252, or in combination therewith.

Each inner lid 266 includes two or more finger wells 268 that enable separation of the inner lid from the vessel base 202 by, for example, squeezing the two fingers inserted into the finger wells 268 together to cause the inner lid 266 to deflect from the surrounding rim. Alternatively, it is possible to deflect the inner lid 266 upward from its seat on ribs 248 by pulling on one or both finger wells 268. As such, although two finger wells 268 are shown, it is possible to provide only a single finger well 268.

Figure 27:
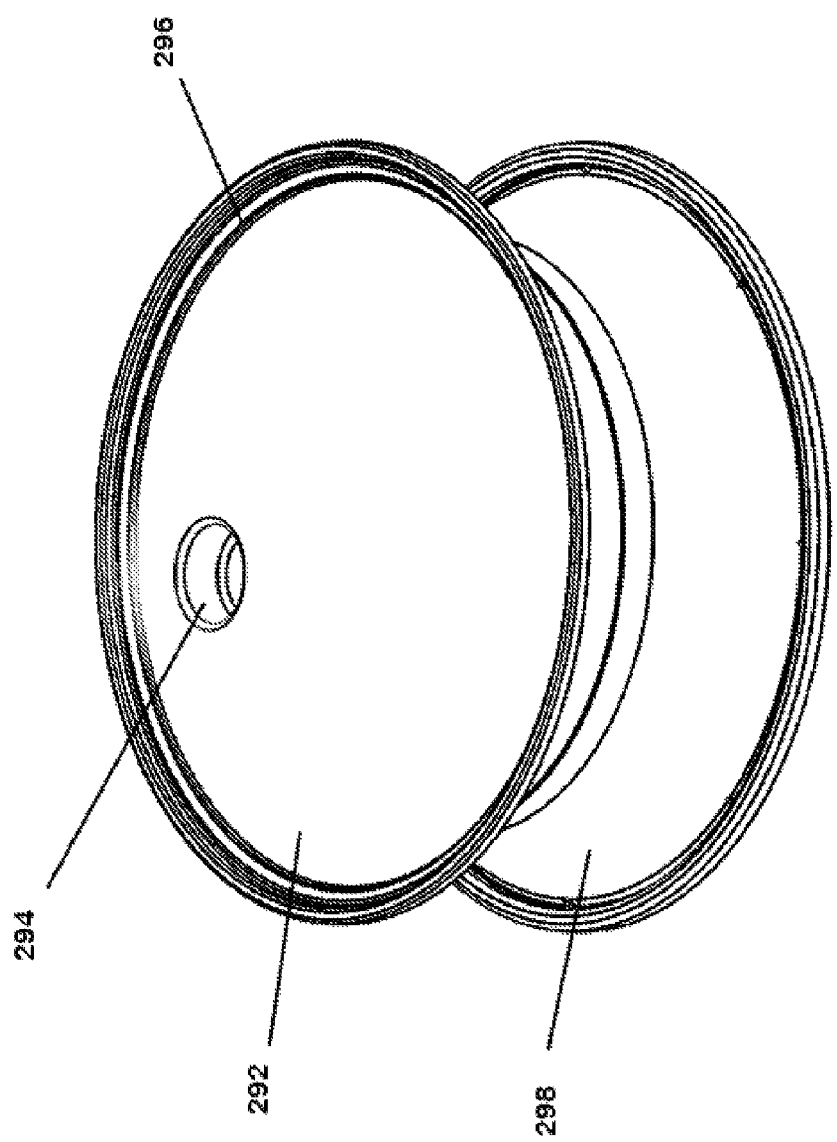
FIG. 27 is a perspective view of another embodiment of a vessel in accordance with the invention.
Figure 28:
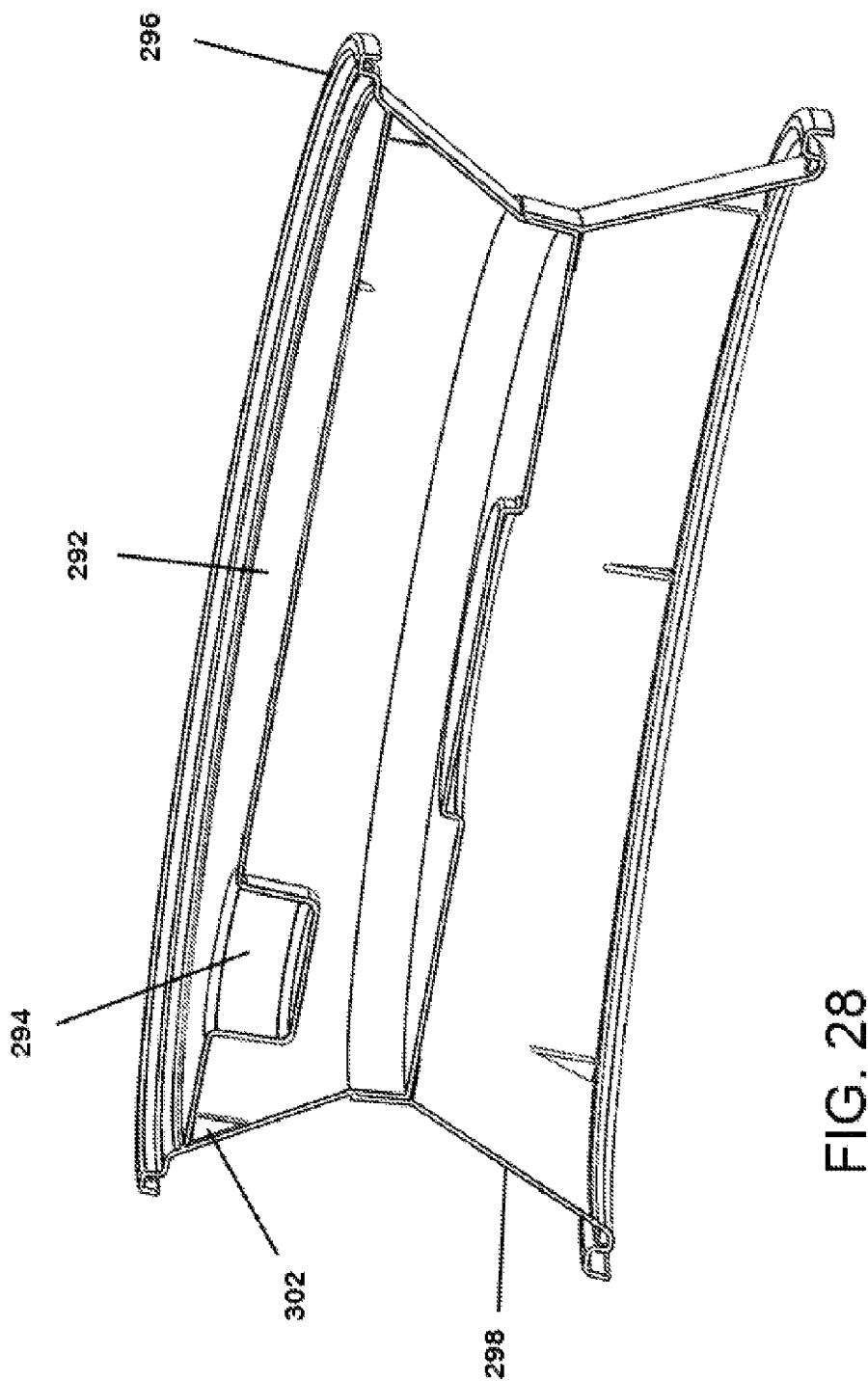
FIG. 28 is a cross-sectional view of the embodiment of the vessel shown in FIG. 27.

This is shown in FIGS. 27 and 28, wherein the inner lid 292 includes a single finger well 294 that is not positioned in the center of the inner lid 292, i.e., off-centered. The single finger well 294 is also positioned adjacent or close to the edge of the inner lid 292, the specific positioning to allow for removal of the inner lid 292 would be readily discernible by one skilled in the art. The inner lid 292 may be used in any of the embodiments of the invention described herein, e.g., instead of lids 44, 46. In fact, any of the lids that engage with the vessel base of any of the embodiments herein, i.e. the inner lids, should be considered interchangeable with one another.

The presence of one, two or more finger wells 268, 294 provides an advantage over the use of a tab as in embodiments described above because the finger wells are easier to grab and mold onto the inner lid 266, 292. A person suffering from arthritis or carpal tunnel syndrome can also manipulate finger wells 268, 294 better than a tab, since it is less prone to cramping. In fact, the inner lid 292 with the single finger well 294 allows a person to pull the inner lid 292 open by pulling the inner lid 292 away from the adjacent edge 296 of the vessel base 298, possibly exerting outward pressure against the adjacent edge 296 of the vessel base 298, to thereby disengage the inner lid 292 from the vessel base 298.

In addition, it is possible to open the lid 292 by pushing down into the finger well 294 to deflect the lid 292. To this end, the finger well 294 is preferably placed at a location over or close to a rib 302 that forms the lid supporting structure to prevent the lid 292 from crushing inward when the downward pressure is applied (see FIG. 28). The finger well 294 should also be preferably offset sufficiently to allow the edge of the inner lid 292 to deflect over the rib 302. That is, there should be sufficient space for deflection of the lid 292 when downwardly pressed to engage the rib 302 and move over a bead above the lid 292 that maintains the lid 292 in place. During manufacture, it is possible to ensure proper registration between the finger well 294 and the rib 302. If necessary, cooperating structure on the lid 292 and the vessel base 298 may be provided to cause the finger well 294 to be positioned close to one of the ribs 302 to allow for the removal of the lid 292 by the application of inward pressure via the finger well 294.

There are thus different criteria for placement of the single finger well 294 dependent on the expected manner of removal of the lid 292.

Figure 25:
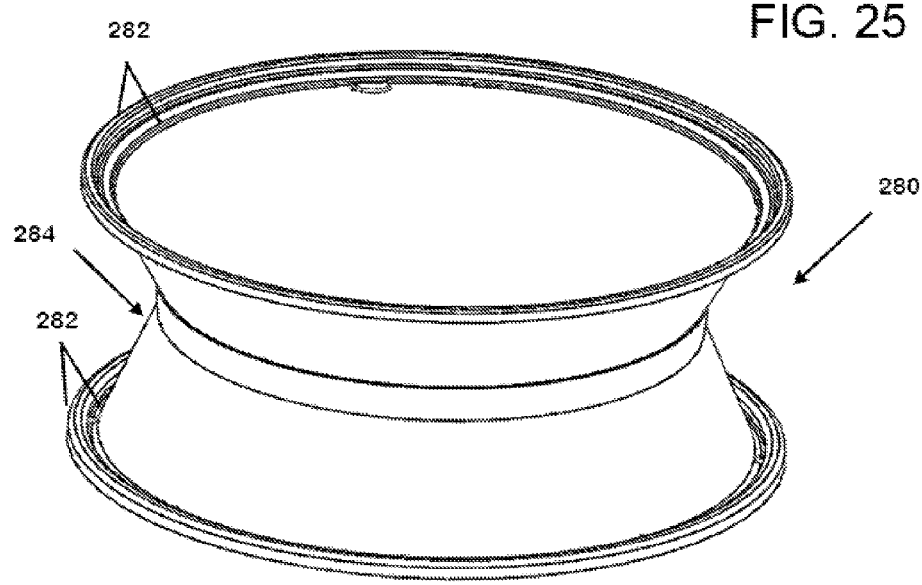
FIG. 25 is a perspective view of a vessel similar to the vessel shown in FIGS. 8-14.

FIG. 25 shows another vessel 280 in accordance with the invention. Vessel 280 is similar to vessel 102 except that it is manufactured to have different properties, i.e., it is not a uniform composition of material with the same hardness. For example, each rim portions 282 may be co-molded or over-molded in a softer durometer material to improve the suction function of the seal rims. The material of rim portions 282 may thus be different than the material of the remaining portion of a vessel base 284. The rim portions 282, for example, may be made of silicone while the remaining portion of the vessel base 284 is made of, for example, polypropylene. The rim portions 282 would thus be more pliable while the remaining portions of the vessel base 284 would be stiffer and better able to keep their shape and retain objects in the compartments defined by the vessel base 284.

Similarly, FIG. 26 shows another vessel 286 in accordance with the invention, similar to that shown in FIGS. 1-7. However, as with the embodiment shown in FIG. 25, vessel 286 is manufactured to have different properties. Each rim portions 288 may be co-molded or over-molded in a softer durometer material to improve the suction function of the rims and/or the lid-retaining capability of the rim. The material of rim portions 288 may thus be different than the material of the remaining portion of a vessel base 290. The rim portions 288 may be made of silicone while the remaining portion of the vessel base 290 is made, for example, of polypropylene. The rim portions 288 would thus be more pliable while the remaining portions of the vessel base 290 would be stiffer and better able to keep their shape and retain objects in the compartments defined by the vessel base 288.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A vessel, comprising:
   a vessel base comprising:
      an intermediate wall portion, an upper wall portion on one side of said intermediate wall portion, a lower wall portion on an opposite side of said intermediate wall portion, a lower rim adjacent said lower wall portion and an upper rim adjacent said upper wall portion,
      said upper wall portion and said intermediate wall portion defining an upper chamber space including at least one upper chamber,
      said lower wall portion and said intermediate wall portion defining a lower chamber space including at least one lower chamber, and
   at least one upper lid that selectively closes said upper chamber space, each of said at least one upper lid comprising an upper inner lid that engages with an upper lid receiving portion defined by said vessel base inward of said upper rim or an upper outer lid configured to engage with said upper rim and surround said upper inner lid when present; and
   at least one lower lid that selectively closes said lower chamber space, each of said at least one lower lid comprising a lower inner lid that engages with a lower lid receiving portion defined by said vessel base inward of said lower rim or a lower outer lid configured to engage with said lower rim and surround said lower inner lid when present,
   said upper wall portion tapering radially outward from said intermediate wall portion and said upper lid receiving portion being defined on said upper wall portion such that said upper inner lid extends entirely over said intermediate wall portion,
   said lower wall portion tapering radially outward from said intermediate wall portion and said lower lid receiving portion being defined on lower wall portion such that said lower inner lid extends entirely under said intermediate wall portion.

2. The vessel of claim 1, wherein at least one of said upper and lower rims is configured to provide suction when pressed against a flat surface.

3. The vessel of claim 1, wherein said at least one upper lid comprises both said upper outer lid and said upper inner lid.

4. The vessel of claim 1, wherein said at least one lower lid comprises both said lower outer lid and said lower inner lid.

5. The vessel of claim 1, wherein said base has a unitary structure.

6. The vessel of claim 1, wherein said base includes lid-engaging means for removably trapping said at least one lower lid onto said base.

7. The vessel of claim 1, wherein said base includes lid-supporting means for supporting said at least one lower lid in engagement with said base.

8. The vessel of claim 1, further comprising container support means for supporting at least one interior container in each of said upper and lower chamber spaces, said container support means comprising a rim formed on said intermediate wall and extending into each of said upper and lower chamber spaces.

9. The vessel of claim 1, wherein said upper rim is configured to have a complementary structure to said lower rim to enable stackability of the vessel via engagement of a lower rim of one vessel to an upper rim of another vessel.

10. The vessel of claim 1, wherein said base includes a first vessel part and a second vessel part that is selectively separable from said first vessel part, said first vessel part defining said intermediate wall portion, said upper wall portion and said upper rim, and said second vessel part defining said lower wall portion and said lower rim.

11. The vessel of claim 10, further comprising cooperating mating structure to selectively attach said first and second vessel parts together, said mating structure including an annular seat and an annular wall on said second vessel part, said first vessel part having a mating portion configured to fit with a tight interference inside said annular rim wall and on said annular seat.

12. The vessel of claim 11, wherein said annular wall includes a plurality of notches to increase outward flexibility of said annular wall.

13. The vessel of claim 11, further comprising a gasket arranged on said annular seat.

14. The vessel of claim 1, wherein said at least one lower lid comprises said lower inner lid and said lower inner lid consists of a single inwardly recessed finger well situated off-center and adjacent an edge of said lower inner lid to enable said lower inner lid to be removed from engagement with said vessel base.

15. The vessel of claim 1, wherein said vessel base includes lid-supporting ribs that support said at least one lower lid in engagement with said vessel base, said at least one lower lid comprising said lower inner lid and said lower inner lid consisting of a single inwardly recessed finger well situated off-center and adjacent an edge of said lower inner lid to enable said lower inner lid to be removed from engagement with said vessel base, said finger well being situated close to one of said ribs to prevent said lower inner lid from crushing inward when downward pressure is applied via said finger well.

16. The vessel of claim 1, wherein said at least one lower lid comprises said lower inner lid or said at least one upper lid comprises said upper inner lid, said lower inner lid or said upper inner lid comprising two inwardly recessed finger wells spaced close to one another to enable said lower inner lid or said upper inner lid to be pulled away from said vessel base.

17. The vessel of claim 1, wherein said vessel base has an upper and lower rim portion that are softer and more flexible than a remaining portion of said vessel base.

18. The vessel of claim 1, wherein said at least one upper lid comprises said upper inner lid, further comprising means for trapping said upper inner lid against an inner circumferential surface of said upper lid receiving portion.

19. The vessel of claim 1, wherein said at least one upper lid comprises said upper inner lid, said upper inner lid having a first position in engagement with said upper lid receiving portion and a second position separated from said upper lid receiving portion and being configured to be pullable from the first position into the second position.

20. A vessel, comprising:
a vessel base comprising:
an intermediate wall portion, an upper wall portion on one side of said intermediate wall portion, a lower wall portion on an opposite side of said intermediate wall portion, a lower rim adjacent said lower wall portion and an upper rim adjacent said upper wall portion,
said upper wall portion and said intermediate wall portion defining an upper chamber space including at least one upper chamber,
said lower wall portion and said intermediate wall portion defining a lower chamber space including at least one lower chamber, and
at least one upper lid that selectively closes said upper chamber space, each of said at least one upper lid comprising an upper inner lid that engages with an upper lid receiving portion defined by said vessel base inward of said upper rim or an upper outer lid configured to engage with said upper rim and surround said upper inner lid when present; and
at least one lower lid that selectively closes said lower chamber space, each of said at least one lower lid comprising a lower inner lid that engages with a lower lid receiving portion defined by said vessel base inward of said lower rim or a lower outer lid configured to engage with said lower rim and surround said lower inner lid when present, and
at least one of said upper and lower rims is present and configured to provide suction when pressed against a flat surface.

21. A vessel, comprising:
a vessel base comprising:
an intermediate wall portion, an upper wall portion on one side of said intermediate wall portion, a lower wall portion on an opposite side of said intermediate wall portion, a lower rim adjacent said lower wall portion and an upper rim adjacent said upper wall portion,
said upper wall portion and said intermediate wall portion defining an upper chamber space including at least one upper chamber,
said lower wall portion and said intermediate wall portion defining a lower chamber space including at least one lower chamber, and
at least one upper lid that selectively closes said upper chamber space, each of said at least one upper lid comprising an upper inner lid that engages with an upper lid receiving portion defined by said vessel base inward of said upper rim or an upper outer lid configured to engage with said upper rim and surround said upper inner lid when present; and
at least one lower lid that selectively closes said lower chamber space, each of said at least one lower lid comprising a lower inner lid that engages with a lower lid receiving portion defined by said vessel base inward of said lower rim or a lower outer lid configured to engage with said lower rim and surround said lower inner lid when present, and
wherein said at least one lower lid comprises said lower inner lid and said lower inner lid consists of a single inwardly recessed finger well situated off-center and adjacent an edge of said lower inner lid to enable said lower inner lid to be removed from engagement with said vessel base.

22. A vessel, comprising:
a vessel base comprising:
an intermediate wall portion, an upper wall portion on one side of said intermediate wall portion, a lower wall portion on an opposite side of said intermediate wall portion, a lower rim adjacent said lower wall portion and an upper rim adjacent said upper wall portion,
said upper wall portion and said intermediate wall portion defining an upper chamber space including at least one upper chamber,
said lower wall portion and said intermediate wall portion defining a lower chamber space including at least one lower chamber, and
at least one upper lid that selectively closes said upper chamber space, each of said at least one upper lid comprising an upper inner lid that engages with an upper lid receiving portion defined by said vessel base inward of said upper rim or an upper outer lid configured to engage with said upper rim and surround said upper inner lid when present; and
at least one lower lid that selectively closes said lower chamber space, each of said at least one lower lid comprising a lower inner lid that engages with a lower lid receiving portion defined by said vessel base inward of said lower rim or a lower outer lid configured to engage with said lower rim and surround said lower inner lid when present, and
wherein said vessel base includes lid-supporting ribs that support said at least one lower lid in engagement with said vessel base, said at least one lower lid comprising said lower inner lid and said lower inner lid consisting of a single inwardly recessed finger well situated off-center and adjacent an edge of said lower inner lid to enable said lower inner lid to be removed from engagement with said vessel base, said finger well being situated close to one of said ribs to prevent said lower inner lid from crushing inward when downward pressure is applied via said finger well.

* * * * *

UNITED STATES PATENT AND TRADEMARK OFFICE
CERTIFICATE OF CORRECTION

| | | |
|---|---|---|
| PATENT NO. | : 8,939,310 B1 | Page 1 of 1 |
| APPLICATION NO. | : 14/220481 | |
| DATED | : January 27, 2015 | |
| INVENTOR(S) | : David M. Stravitz | |

It is certified that error appears in the above-identified patent and that said Letters Patent is hereby corrected as shown below:

In the Claims

Col. 8, line 50, after "annular", delete "rim".

Signed and Sealed this
Twenty-eighth Day of April, 2015

Michelle K. Lee
*Director of the United States Patent and Trademark Office*